United States Patent
Harale et al.

(10) Patent No.: US 11,492,254 B2
(45) Date of Patent: Nov. 8, 2022

(54) HYDROGEN PRODUCTION WITH MEMBRANE REFORMER

(71) Applicant: Saudi Arabian Oil Company, Dhahran (SA)

(72) Inventors: Aadesh Harale, Dhahran (SA); Aqil Jamal, Dhahran (SA); Stephen N. Paglieri, Dhahran (SA); Henk van Veen, Bergen (NL); Francesco Sebastiani, Haarlem (NL); Sai P. Katikaneni, Dhahran Hills (SA)

(73) Assignee: Saudi Arabian Oil Company, Dhahran (SA)

( * ) Notice: Subject to any disclaimer, the term of this patent is extended or adjusted under 35 U.S.C. 154(b) by 165 days.

(21) Appl. No.: 16/905,790

(22) Filed: Jun. 18, 2020

(65) Prior Publication Data
US 2021/0395083 A1    Dec. 23, 2021

(51) Int. Cl.
*C01B 3/38* (2006.01)
*C01B 32/50* (2017.01)

(52) U.S. Cl.
CPC .............. *C01B 3/382* (2013.01); *C01B 32/50* (2017.08); *C01B 2203/0233* (2013.01); *C01B 2203/041* (2013.01); *C01B 2203/042* (2013.01); *C01B 2203/046* (2013.01); *C01B 2203/1235* (2013.01)

(58) Field of Classification Search
CPC . C01B 3/382; C01B 32/50; C01B 2203/0233; C01B 2203/041; C01B 2203/042; C01B 2203/046; C01B 2203/1235
See application file for complete search history.

(56) References Cited

U.S. PATENT DOCUMENTS

| | | |
|---|---|---|
| 978,576 A | 12/1910 | Goodell |
| 2,614,066 A | 10/1952 | Cornell |
| 2,910,426 A | 10/1959 | Gluesenkamp |
| 3,278,268 A | 10/1966 | Pfefferle, Jr. |
| 3,409,540 A | 11/1968 | Gould et al. |
| 3,533,938 A | 10/1970 | Leas Arnold |
| 3,702,292 A | 11/1972 | Burich |
| 3,726,789 A | 4/1973 | Kovach |

(Continued)

FOREIGN PATENT DOCUMENTS

| | | |
|---|---|---|
| AU | 2003286894 | 6/2004 |
| AU | 2005286952 | 3/2006 |

(Continued)

OTHER PUBLICATIONS

Rohland et al. "Electrochemical hydrogen compressor" Electrochimica Acta, vol. 43, No. 24, pp. 3841-3846, 1998 (Year: 1998).*

(Continued)

*Primary Examiner* — Steven J Bos
*Assistant Examiner* — Syed T Iqbal
(74) *Attorney, Agent, or Firm* — Fish & Richardson P.C.

(57) ABSTRACT

A system and method of producing hydrogen, including converting hydrocarbon to methane via steam and pre-reforming catalyst in a pre-reformer, converting the methane to hydrogen and carbon dioxide by steam reforming via a reforming catalyst in a membrane reformer, diffusing through hydrogen through a tubular membrane in the membrane reformer.

37 Claims, 17 Drawing Sheets

(56) References Cited

U.S. PATENT DOCUMENTS

| | | |
|---|---|---|
| 3,755,143 A | 8/1973 | Hosoi et al. |
| 3,856,659 A | 12/1974 | Owen |
| 3,979,757 A | 9/1976 | Kilby et al. |
| 4,090,949 A | 5/1978 | Owen et al. |
| 4,134,824 A | 1/1979 | Kamm et al. |
| 4,264,435 A | 4/1981 | Read, Jr. et al. |
| 4,297,203 A | 10/1981 | Ford et al. |
| 4,426,276 A | 1/1984 | Dean et al. |
| 4,466,946 A | 8/1984 | Goddin, Jr. et al. |
| 4,527,003 A | 7/1985 | Okamoto et al. |
| 4,587,011 A | 5/1986 | Okamoto et al. |
| 4,589,896 A | 5/1986 | Chen et al. |
| 4,655,904 A | 4/1987 | Okamoto et al. |
| 4,717,407 A | 1/1988 | Choe et al. |
| 4,725,349 A | 2/1988 | Okamoto et al. |
| 4,786,400 A | 11/1988 | Farnsworth |
| 4,830,728 A | 5/1989 | Herbst et al. |
| 4,981,676 A | 1/1991 | Minet et al. |
| 4,992,160 A | 2/1991 | Long et al. |
| 5,091,351 A | 2/1992 | Murakawa et al. |
| 5,108,581 A | 4/1992 | Aldridge |
| 5,229,102 A | 7/1993 | Minet et al. |
| 5,366,712 A | 11/1994 | Violante |
| 5,401,300 A | 3/1995 | Lokhandwala et al. |
| 5,407,466 A | 4/1995 | Lokhandwala et al. |
| 5,407,467 A | 4/1995 | Lokhandwala et al. |
| 5,746,985 A | 5/1998 | Takahashi |
| 5,837,032 A | 11/1998 | Moll et al. |
| 5,904,837 A | 5/1999 | Fujiyama |
| 5,906,728 A | 5/1999 | Iaccino et al. |
| 5,951,850 A | 9/1999 | Ino et al. |
| 5,997,594 A | 12/1999 | Edlund et al. |
| 6,033,555 A | 3/2000 | Chen et al. |
| 6,119,606 A | 9/2000 | Clark |
| 6,153,163 A | 11/2000 | Prasad |
| 6,179,900 B1 | 1/2001 | Behling et al. |
| 6,180,081 B1 | 1/2001 | Poschmann et al. |
| 6,190,533 B1 | 2/2001 | Bradow et al. |
| 6,210,562 B1 | 3/2001 | Xie et al. |
| 6,274,032 B2 | 8/2001 | Hood et al. |
| 6,293,979 B1 | 9/2001 | Choudhary et al. |
| 6,296,686 B1 | 10/2001 | Prasad et al. |
| 6,338,833 B1 | 1/2002 | Aasberg-Petersen |
| 6,361,582 B1 | 3/2002 | Pinnau et al. |
| 6,531,515 B2 | 3/2003 | Moore, Jr. et al. |
| 6,656,346 B2 | 12/2003 | Ino et al. |
| 6,743,961 B2 | 6/2004 | Powers |
| 6,830,596 B1 | 12/2004 | Deckman et al. |
| 6,896,717 B2 | 5/2005 | Pinnau et al. |
| 6,960,235 B2 | 11/2005 | Morse et al. |
| 6,979,757 B2 | 12/2005 | Powers |
| 7,019,187 B2 | 3/2006 | Powers |
| 7,022,165 B2 | 4/2006 | Paglieri et al. |
| 7,025,941 B1 | 4/2006 | Autenrieth et al. |
| 7,045,554 B2 | 5/2006 | Raje |
| 7,132,042 B2 | 11/2006 | Genetti et al. |
| 7,182,917 B2 | 2/2007 | Krueger |
| 7,217,304 B2 | 5/2007 | Deckman et al. |
| 7,323,148 B2 | 1/2008 | Shah et al. |
| 7,353,982 B2 | 4/2008 | Li |
| 7,374,664 B2 | 5/2008 | Powers |
| 7,396,449 B2 | 7/2008 | Powers |
| 7,404,889 B1 | 7/2008 | Powers |
| 7,419,584 B2 | 9/2008 | Stell et al. |
| 7,527,661 B2 | 5/2009 | Chellappa et al. |
| 7,550,642 B2 | 6/2009 | Powers |
| 7,642,292 B2 | 1/2010 | Severinsky |
| 7,744,747 B2 | 6/2010 | Halsey |
| 7,858,834 B2 | 12/2010 | Powers |
| 7,871,457 B2 | 1/2011 | Shah et al. |
| 7,959,897 B2 | 6/2011 | Cui et al. |
| 7,972,498 B2 | 7/2011 | Buchanan et al. |
| 7,973,087 B2 | 7/2011 | Kibby et al. |
| 8,198,338 B2 | 6/2012 | Shulenberger et al. |
| 8,518,151 B2 | 8/2013 | Tessier et al. |
| 8,563,185 B2 | 10/2013 | Assink et al. |
| 8,585,802 B2 | 11/2013 | Keller |
| 8,597,383 B2 | 12/2013 | Pham et al. |
| 8,726,983 B2 | 5/2014 | Khan |
| 8,828,121 B1 | 9/2014 | He et al. |
| 8,900,546 B2 | 12/2014 | Van De Graaf et al. |
| 8,931,347 B2 | 1/2015 | Donzier et al. |
| 9,085,497 B2 | 7/2015 | Jennings |
| 9,096,806 B2 | 8/2015 | Abba et al. |
| 9,138,718 B2 | 9/2015 | Li et al. |
| 9,242,230 B2 | 1/2016 | Moon et al. |
| 9,255,230 B2 | 2/2016 | Shafi et al. |
| 9,279,088 B2 | 3/2016 | Shafi et al. |
| 9,284,497 B2 | 3/2016 | Bourane et al. |
| 9,284,502 B2 | 3/2016 | Bourane et al. |
| 9,296,961 B2 | 3/2016 | Shafi et al. |
| 9,328,035 B1 | 5/2016 | Kuhn et al. |
| 9,493,350 B2 | 11/2016 | Morico et al. |
| 9,752,080 B2 | 9/2017 | Christensen et al. |
| 9,863,244 B2 | 1/2018 | Donzier et al. |
| 9,952,192 B2 | 4/2018 | Donzier et al. |
| 10,357,759 B2 | 7/2019 | D'Souza et al. |
| 10,472,951 B2 | 11/2019 | Donzier et al. |
| 10,527,751 B2 | 1/2020 | Donzier et al. |
| 2002/0098394 A1* | 7/2002 | Keefer .............. H01M 8/0612 429/412 |
| 2003/0041519 A1 | 3/2003 | Maruko |
| 2003/0129109 A1 | 7/2003 | Bronicki |
| 2003/0172589 A1 | 9/2003 | Krueger |
| 2004/0120889 A1 | 6/2004 | Shah et al. |
| 2005/0045034 A1 | 3/2005 | Paglieri et al. |
| 2005/0109037 A1 | 5/2005 | Deckman et al. |
| 2005/0109821 A1 | 5/2005 | Li |
| 2005/0211603 A1 | 9/2005 | Guillaume et al. |
| 2005/0217479 A1 | 10/2005 | Hale et al. |
| 2006/0013759 A1 | 1/2006 | Jiang et al. |
| 2006/0057060 A1 | 3/2006 | Sun et al. |
| 2006/0124445 A1 | 6/2006 | Labrecque et al. |
| 2007/0157517 A1 | 6/2007 | Tsay et al. |
| 2007/0180991 A1 | 8/2007 | Chellappa et al. |
| 2008/0001645 A1 | 1/2008 | Kuroki |
| 2008/0011644 A1 | 1/2008 | Dean et al. |
| 2008/0011645 A1 | 1/2008 | Dean |
| 2008/0019902 A1 | 1/2008 | Rei et al. |
| 2008/0083648 A1 | 4/2008 | Bishop et al. |
| 2008/0194900 A1 | 8/2008 | Bhirud |
| 2008/0277314 A1 | 11/2008 | Halsey |
| 2008/0283445 A1 | 11/2008 | Powers |
| 2009/0050523 A1 | 2/2009 | Halsey |
| 2009/0123364 A1 | 5/2009 | Forsyth et al. |
| 2009/0155650 A1* | 6/2009 | Cui .................... H01M 8/0662 429/495 |
| 2010/0089795 A1 | 4/2010 | Fujiyama et al. |
| 2010/0137458 A1 | 6/2010 | Erling |
| 2010/0260657 A1 | 10/2010 | Niitsuma et al. |
| 2011/0076225 A1 | 3/2011 | Shah et al. |
| 2011/0083996 A1 | 4/2011 | Shafi et al. |
| 2011/0177410 A1 | 7/2011 | Assink et al. |
| 2011/0247500 A1 | 10/2011 | Akhras et al. |
| 2012/0111051 A1 | 5/2012 | Kulkarni et al. |
| 2012/0118011 A1 | 5/2012 | Terrien et al. |
| 2012/0168154 A1 | 7/2012 | Chinn et al. |
| 2012/0195824 A1 | 8/2012 | Van De Graaf et al. |
| 2012/0258037 A1 | 10/2012 | Pham et al. |
| 2012/0323059 A1 | 12/2012 | Liu et al. |
| 2013/0129610 A1 | 5/2013 | Kale |
| 2013/0156685 A1* | 6/2013 | Vauk .................... C01B 3/56 423/652 |
| 2013/0220884 A1 | 8/2013 | Bourane et al. |
| 2013/0233766 A1 | 9/2013 | Shafi et al. |
| 2013/0248419 A1 | 9/2013 | Abba |
| 2014/0170061 A1 | 6/2014 | Chaubey et al. |
| 2014/0363345 A1 | 12/2014 | Li et al. |
| 2015/0037246 A1 | 2/2015 | Morico et al. |
| 2015/0240717 A1 | 8/2015 | Starcher et al. |
| 2015/0290575 A1 | 10/2015 | Rothermel et al. |
| 2016/0214859 A1 | 6/2016 | Beltramini et al. |
| 2016/0264886 A1 | 9/2016 | Davydov |
| 2016/0325990 A1 | 11/2016 | Galloway |

(56) References Cited

U.S. PATENT DOCUMENTS

| | | |
|---|---|---|
| 2016/0340187 A1 | 11/2016 | Said et al. |
| 2017/0050845 A1 | 2/2017 | Lofberg et al. |
| 2018/0079643 A1 | 3/2018 | Mortensen et al. |
| 2018/0119026 A1 | 5/2018 | Kinzl et al. |
| 2018/0148655 A1 | 5/2018 | Low et al. |
| 2018/0187106 A1 | 7/2018 | Abudawoud et al. |
| 2018/0187107 A1 | 7/2018 | Abudawoud et al. |
| 2018/0312767 A1 | 11/2018 | Al-Sayed et al. |
| 2018/0370796 A1 | 12/2018 | Mokheimer et al. |
| 2019/0003303 A1 | 1/2019 | Donzier et al. |
| 2019/0112535 A1 | 4/2019 | Kinzl et al. |
| 2019/0135624 A1 | 5/2019 | Mair |
| 2019/0376821 A1 | 12/2019 | Donzier et al. |
| 2021/0309515 A1 | 10/2021 | Younes et al. |
| 2021/0394152 A1 | 12/2021 | Harale et al. |
| 2021/0395085 A1 | 12/2021 | Paglieri et al. |

FOREIGN PATENT DOCUMENTS

| | | |
|---|---|---|
| AU | 2005287034 | 3/2006 |
| AU | 2010291148 | 3/2011 |
| AU | 2012243063 | 10/2012 |
| CA | 2458314 | 4/1999 |
| CA | 2580580 | 3/2006 |
| CA | 2580585 | 3/2006 |
| CA | 2547011 | 8/2008 |
| CA | 2414657 | 5/2011 |
| CA | 2938299 | 5/2015 |
| CN | 104098071 | 10/2014 |
| CN | 102482079 | 5/2016 |
| CN | 103596671 | 6/2016 |
| CN | 105197887 | 3/2017 |
| CN | 105776133 | 11/2017 |
| EP | 130933 | 9/1987 |
| EP | 684066 | 11/1995 |
| EP | 1024111 | 8/2000 |
| EP | 1294637 | 3/2003 |
| EP | 1789171 | 5/2007 |
| EP | 1789172 | 5/2007 |
| EP | 1829821 | 9/2007 |
| EP | 2035329 | 3/2009 |
| EP | 909804 | 9/2010 |
| EP | 2696966 | 2/2014 |
| EP | 2825503 | 1/2015 |
| EP | 2473441 | 8/2018 |
| FR | 2943657 | 3/2009 |
| JP | H06345405 | 12/1994 |
| JP | H06345405 A * | 12/1994 |
| JP | H09278403 | 10/1997 |
| JP | 2943657 | 8/1999 |
| JP | 2001348205 | 12/2001 |
| JP | 2004502623 | 1/2004 |
| JP | 2004249264 | 9/2004 |
| JP | 2004352528 | 12/2004 |
| JP | 2007190455 | 8/2007 |
| JP | 2008513337 | 5/2008 |
| JP | 2008513338 | 5/2008 |
| JP | 4381033 | 10/2009 |
| JP | 2010266155 | 11/2010 |
| JP | 2011195352 | 10/2011 |
| JP | 2011195387 | 10/2011 |
| JP | 2011206612 | 10/2011 |
| JP | 2013503807 | 2/2013 |
| JP | 5390448 | 10/2013 |
| JP | 5588581 | 8/2014 |
| JP | 2014519463 | 8/2014 |
| JP | 5611627 | 9/2014 |
| JP | 2014169222 | 9/2014 |
| JP | 6040701 | 12/2016 |
| JP | 6345406 | 6/2018 |
| NO | 200701530 | 4/2007 |
| NO | 200701532 | 6/2007 |
| TW | 200619136 | 6/2006 |
| TW | 200630158 | 9/2006 |
| WO | 2000009633 | 2/2000 |
| WO | 2001064577 | 9/2001 |
| WO | 2002002460 | 1/2002 |
| WO | 2002070402 | 9/2002 |
| WO | 2004041714 | 5/2004 |
| WO | 2005051590 | 6/2005 |
| WO | 2006034086 | 3/2006 |
| WO | 2006034100 | 3/2006 |
| WO | 2006034103 | 3/2006 |
| WO | 2006082933 | 8/2006 |
| WO | 2006097703 | 9/2006 |
| WO | 2007031713 | 3/2007 |
| WO | 2008000782 | 1/2008 |
| WO | WO 2009013455 | 1/2009 |
| WO | 2009073436 | 6/2009 |
| WO | 2010009077 | 1/2010 |
| WO | 2010009082 | 1/2010 |
| WO | 2010009089 | 1/2010 |
| WO | 2010109106 | 9/2010 |
| WO | 2010143783 | 12/2010 |
| WO | 2011026943 | 3/2011 |
| WO | 2012006429 | 1/2012 |
| WO | 2012142009 | 10/2012 |
| WO | 2012143096 | 10/2012 |
| WO | 2012158673 | 11/2012 |
| WO | 2013137720 | 9/2013 |
| WO | 2015128045 | 9/2013 |
| WO | 2015183200 | 12/2015 |
| WO | 2016207892 | 12/2016 |
| WO | 2018226617 | 12/2018 |
| ZA | 2012001141 | 10/2012 |

OTHER PUBLICATIONS

Boeltken et al. "Ultra-compact microstructured methane steam reformer with integrated Palladium membrane for on-site production of pure hydrogen: Experimental demonstration", International Journal of Hydrogen Energy 39 (2014) p. 18058-18068. (Year: 2014).*

Abbassi et al., "Efficiency improvements in production profiling using ultracompact flow array sensing technology," Petrophysics, Aug. 2018, 59(4): 457-488.

Amo et al., "Low-Quality Natural Gas Sulfur Removal/Recovery," Membrane Technology and Research, DOE Report DE-AC21-92MC28133—01, Jan. 29, 1998, 107 pages.

Aschoundong et al., "Silane Modification of Cellulose Acetate Dense Films as Materials for Acid Gas Removal Macromolecules," Macromolecules, vol. 46, No. 14, Jul. 9, 2013, 11 pages.

Belov et al., "Gas transport and free volume in hexafluoropropylene polymers," Journal of Membrane Science, vol. 383, Nov. 2011, 8 pages.

Bernardo et al., "Gas transport properties of Pebax/room temperature ionic liquid gel membranes" Separation and Purification Technology vol. 97, Sep. 2012, 13 pages.

Bhide et al., "Hybrid processes for the removal of acid gases from natural gas," Journal of Membrane Science, vol. 140, Issue 1, Mar. 4, 1998, 2 pages, Abstract Only.

Chatterjee et al., "Poly(ether urethane) and poly(ether urethane urea) membranes with high $H_2S/CH_4$ selectivity," Journal of Membrane Science, vol. 135, No. 99, Nov. 1997, 8 pages.

Jansen et al., "On the unusual solvent and the effect on the gas transport in perfluorinated Hyflon AD Membranes," Journal of Membrane Science, vol. 287, Issue 1, Jan. 2007, 6 pages.

Kraftschik et al., "Dense film polyimide membranes for aggressive sour gas feed separations," Journal of Membrane Science vol. 428, Feb. 1, 2013, 12 pages.

Lallemand et al., "Extending the treatment of highly sour gases: cryogenic distillation," Digital Refining: Processing, Operations & Maintenance, Jan. 2014, 8 pages.

Lallemand et al., "Highly sour gas processing: Bulk removal with SPREX Process," IPTC-10581-MS, International Petroleum Technology Conference, Nov. 2005, 18 pages.

Lallemand et al., "Solutions for the treatment of highly sour gases," Digital Refining: Processing, Operations & Maintenance, Apr. 2012, 14 pages.

(56) References Cited

OTHER PUBLICATIONS

Lockhart, "Sour oil and gas management: 3.3," vol. Lii/New Developments: Energy, Transport, Sustainability Encyclopedia of Hydrocarbons, 2007, 34 pages.

Lokhandwala et al., "Membrane separation of nitrogen from natural gas: A case study from membrane synthesis to commercial deployment," Journal of Membrane Science 346, Jan. 2010, 10 pages.

Merkel and Toy, "Comparison of Hydrogen Sulfide Transport Properties in Fluorinated and Nonfluorinated Polymers," Macromolecules, vol. 39, No. 22, Sep. 2006, 10 pages.

Mori et al., "Reactor configuration and concentration polarization in methane steam reforming by a membrane reactor with a highly hydrogen-permeable membrane," Industrial & Engineering Chemistry Research, Feb. 2007, 46(7): 1952-1958.

Oi et al., "Simulation and cost comparison of CO2 liquefaction," Energy Procedia, 2016, 86:500-510.

Robeson, "The upper bound revisited," Journal of Membrane Science, vol. 320, Jul. 15, 2008, 11 pages.

Rufford et al., "The removal of CO2 and N2 from natural gas: A review of conventional and emerging process technologies," Journal of Petroleum Science and Engineering, vol. 94-95, Sep. 2012, 32 pages.

Wismann et al., "Electrified methane reforming: A compact approach to greener industrial hydrogen production," Science Magazine, May 2019, 364(6442):756-759.

Xu et al., "An Improved CO2 Separation and Purification System Based on Cryogenic Separation and Distillation Theory," Energies ISSN 1996-1073, May 2014, 7:3484-3502.

PCT International Search Report and Written Opinion in International Appln. No. PCT/US2021/024865, dated Jun. 28, 2021, 13 pages.

Alvarez et al., "Ru-Ni catalyst in the combined dry-stream reforming of methane: the importance in the metal order addition," Topics in Catalysts, Jul. 2015, 59(2):303-313, 11 pages.

Boeltken et al., "Ultra-compact microstructured methane steam reformer with integrated Palladium membrane for on-site production of pure hydrogen: Experimental demonstration," International Journal of Hydrogen Energy, Elsevier Science Publishers, Jul. 2014, 39(31):18058-18068, 11 pages.

Chen et al., "Hydrogen production from the steam reforming of liquid hydrocarbons in membrane reactor," Catalysis Today, Elsevier, Oct. 2006, 118(1-2):136-143, 8 pages.

PCT International Search Report and Written Opinion in International Appln. No. PCT/US2021/036849, dated Sep. 13, 2021, 14 pages.

PCT International Search Report and Written Opinion in International Appln. No. PCT/US2021/036848, dated Sep. 13, 2021, 15 pages.

PCT International Search Report and Written Opinion in International Appln. No. PCT/US2021/036850, dated Sep. 13, 2021, 15 pages.

* cited by examiner

| Nr. | Name | Nr. | Name | Nr. | Name |
|---|---|---|---|---|---|
| R101 | Hydrodesulfurization | E103 | Sweep heater | E204 | Steam superht (HEX) |
| R102 | Pre-reformer | E104 | Permeate cooler | E205 | Steam superht (ELEC) |
| R103 | Membrane reformer | E105 | Permeate condenser | R301 | Afterburner |
| R104 | CO separation | P201 | Feed water pump | E301 | Retentate cooler |
| P101 | H2 Compressor | E201 | Water heater (HEX) | E302 | Retentate condenser |
| E101 | Naphtha heater (HDS) | E202 | Water boiler(HEX) | E303 | $CO_2$ cryo.separation |
| E102 | Naphtha heater (MRF) | E203 | Water boiler (ELEC) | | |

FIG. 5

| Variable | Unit | S1 | | S2 | | S3 | | S4 | | S5 | | S6 | | S7 | | S8 | |
|---|---|---|---|---|---|---|---|---|---|---|---|---|---|---|---|---|---|
| T | °C | 25 | | 350 | | 550 | | 550 | | 550 | | 243 | | 35 | | 5 | |
| P | bara | 30 | | 30 | | 30 | | 30 | | 2 | | 2 | | 2 | | 2 | |
| H | kW | -7.1 | | -0.5 | | 3.7 | | -307.3 | | -259.4 | | -285.0 | | -354.5 | | -2.1 | |
| Fv | m³/hr | 0.04 | | 0.25 | | 0.45 | | 14.12 | | 308.05 | | 192.76 | | 59.50 | | 52.33 | |
| HHV(mix) | MJ/kg | 49.2 | | 49.2 | | 49.2 | | 11.8 | | 16.6 | | 16.8 | | 16.6 | | 136.8 | |
| | | Mass (kg/hr) | Mol (kmol/hr) | Mass (kg/hr) | Mol (kmol/hr) | Mass (kg/hr) | Mol (kmol/hr) | Mass (kg/hr) | Mol (kmol/hr) | Mass (kg/hr) | Mol (kmol/hr) | Mass (kg/hr) | Mol (kmol/hr) | Mass (kg/hr) | Mol (kmol/hr) | Mass (kg/hr) | Mol (kmol/hr) |
| Flows | | 23.34 | 0.21 | 23.34 | 0.21 | 23.34 | 0.21 | 113.42 | 6.23 | 90.14 | 9.00 | 90.14 | 9.00 | 90.14 | 9.00 | 9.43 | 4.52 |
| H2 | | | | | | | | 1.52 | 0.75 | 9.07 | 4.50 | 9.07 | 4.50 | 9.07 | 4.50 | 9.07 | 4.50 |
| CO | | | | | | | | 1.02 | 0.04 | | | | | | | | |
| CO2 | | | | | | | | 25.37 | 0.58 | | | | | | | | |
| CH4 | | | | | | | | 16.86 | 1.05 | | | | | | | | |
| H2O | | | | | | | | 68.64 | 3.81 | 81.07 | 4.50 | 81.07 | 4.50 | 81.07 | 4.50 | 0.36 | 0.02 |
| C8H16 | | 23.34 | 0.21 | 23.34 | 0.21 | 23.34 | 0.21 | 0.00 | 0.00 | | | | | | | | |
| N2 | | | | | | | | 0.00 | 0.00 | | | | | | | | |
| O2 | | | | | | | | | | | | | | | | | |
| Fractions | % | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| H2 | | | | | | | | 1.3 | 12.1 | 10.1 | 50.0 | 10.1 | 50.0 | 10.1 | 50.0 | 96.2 | 99.6 |
| CO | | | | | | | | 0.9 | 0.6 | | | | | | | | |
| CO2 | | | | | | | | 22.4 | 9.3 | | | | | | | | |
| CH4 | | | | | | | | 14.9 | 16.9 | | | | | | | | |
| H2O | | | | | | | | 60.5 | 61.2 | 89.9 | 50.0 | 89.9 | 50.0 | 89.9 | 50.0 | 3.8 | 0.4 |
| C8H16 | | 100.0 | 100.0 | 100.0 | 100.0 | 100.0 | 100.0 | 0.0 | 0.0 | | | | | | | | |
| N2 | | | | | | | | | | | | | | | | | |
| O2 | | | | | | | | 0.0 | 0.0 | | | | | | | | |

FIG. 6

| Variable | Unit | S9 | | S10 | | C1 | | C2 | | C3 | | C4 | | C5 | | C6 | |
|---|---|---|---|---|---|---|---|---|---|---|---|---|---|---|---|---|---|
| T | °C | 40 | | 5 | | 40 | | 40 | | 40 | | 40 | | | | | |
| P | bara | 949 | | 2 | | 668 | | 111 | | 274 | | 45 | | | | | |
| H | kW | 2.2 | | -357.8 | | -0.1 | | -0.4 | | -0.2 | | -0.9 | | | | | |
| Fv | m³/hr | 0.20 | | 0.11 | | 0.00 | | 0.00 | | 0.00 | | 0.00 | | | | | |
| HHV/(mix) | MJ/kg | 142.0 | | 2.5 | | 2.7 | | 2.5 | | 2.6 | | 2.5 | | | | | |
| | | Mass (kg/hr) | Mol (kmol/hr) | Mass (kg/hr) | Mol (kmol/hr) | Mass (kg/hr) | Mol (kmol/hr) | Mass (kg/hr) | Mol (kmol/hr) | Mass (kg/hr) | Mol (kmol/hr) | Mass (kg/hr) | Mol (kmol/hr) | Mass (kg/hr) | Mol (kmol/hr) | Mass (kg/hr) | Mol (kmol/hr) |
| Flows | | 9.08 | 4.50 | 80.71 | 4.48 | 0.02 | 0.00 | 0.09 | 0.00 | 0.04 | 0.00 | 0.20 | 0.01 | | | | |
| H2 | | 9.07 | 4.50 | 0.00 | 0.00 | 0.00 | 0.00 | 0.00 | 0.00 | 0.00 | 0.00 | 0.00 | 0.00 | | | | |
| CO | | | | | | | | | | | | | | | | | |
| CO2 | | | | | | | | | | | | | | | | | |
| CH4 | | | | | | | | | | | | | | | | | |
| H2O | | 0.01 | 0.00 | 80.71 | 4.48 | 0.02 | 0.00 | 0.09 | 0.00 | 0.04 | 0.00 | 0.20 | 0.01 | | | | |
| C8H16 | | | | | | | | | | | | | | | | | |
| N2 | | | | | | | | | | | | | | | | | |
| O2 | | | | | | | | | | | | | | | | | |
| Fractions | % | 100.0 | 100.0 | 100.0 | 100.0 | 100.0 | 100.0 | 100.0 | 100.0 | 100.0 | 100.0 | 100.0 | 100.0 | | | | |
| H2 | | 99.0 | 100.0 | 0.0 | 0.0 | 0.1 | 1.3 | 0.0 | 0.1 | 0.0 | 0.4 | 0.0 | 0.1 | | | | |
| CO | | | | | | | | | | | | | | | | | |
| CO2 | | | | | | | | | | | | | | | | | |
| CH4 | | | | | | | | | | | | | | | | | |
| H2O | | 0.1 | 0.0 | 100.0 | 100.0 | 99.9 | 98.7 | 100.0 | 99.9 | 100.0 | 99.6 | 100.0 | 99.6 | | | | |
| C8H16 | | | | | | | | | | | | | | | | | |
| N2 | | | | | | | | | | | | | | | | | |
| O2 | | | | | | | | | | | | | | | | | |

FIG. 7

| Variable | Unit | W1 | | W2 | | W3 | | W4 | | W5 | | W6 | | W7 | | W8 | |
|---|---|---|---|---|---|---|---|---|---|---|---|---|---|---|---|---|---|
| T | °C | 25 | | 27 | | 234 | | 234 | | 550 | | 550 | | 536 | | 550 | |
| P | bara | 1 | | 30 | | 30 | | 30 | | 30 | | 30 | | 2 | | 2 | |
| H | kW | -754.5 | | -753.9 | | -711.2 | | -623.1 | | -589.8 | | -279.4 | | -279.4 | | -278.7 | |
| Fv | m³/hr | 0.23 | | 0.23 | | 0.29 | | 11.83 | | 21.31 | | 10.09 | | 151.19 | | 153.82 | |
| HHV(mix) | MJ/kg | | | | | | | | | | | | | | | | |
| | | Mass (kg/hr) | Mol (kmol/hr) | Mass (kg/hr) | Mol (kmol/hr) | Mass (kg/hr) | Mol (kmol/hr) | Mass (kg/hr) | Mol (kmol/hr) | Mass (kg/hr) | Mol (kmol/hr) | Mass (kg/hr) | Mol (kmol/hr) | Mass (kg/hr) | Mol (kmol/hr) | Mass (kg/hr) | Mol (kmol/hr) |
| Flows | | 171.15 | 9.50 | 171.15 | 9.50 | 171.15 | 9.50 | 171.15 | 9.50 | 171.15 | 9.50 | 81.07 | 4.50 | 81.07 | 4.50 | 81.07 | 4.50 |
| H2 | | | | | | | | | | | | | | | | | |
| CO | | | | | | | | | | | | | | | | | |
| CO2 | | | | | | | | | | | | | | | | | |
| CH4 | | | | | | | | | | | | | | | | | |
| H2O | | 171.15 | 9.50 | 171.15 | 9.50 | 171.15 | 9.50 | 171.15 | 9.50 | 171.15 | 9.50 | 81.07 | 4.50 | 81.07 | 4.50 | 81.07 | 4.50 |
| C8H16 | | | | | | | | | | | | | | | | | |
| N2 | | | | | | | | | | | | | | | | | |
| O2 | | | | | | | | | | | | | | | | | |
| Fractions | % | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| H2 | | | | | | | | | | | | | | | | | |
| CO | | | | | | | | | | | | | | | | | |
| CO2 | | | | | | | | | | | | | | | | | |
| CH4 | | | | | | | | | | | | | | | | | |
| H2O | | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| C8H16 | | | | | | | | | | | | | | | | | |
| N2 | | | | | | | | | | | | | | | | | |
| O2 | | | | | | | | | | | | | | | | | |

FIG. 8

| Variable | Unit | W1 | | W2 | | W3 | | W4 | | W5 | | W6 | | W7 | | W8 | |
|---|---|---|---|---|---|---|---|---|---|---|---|---|---|---|---|---|---|
| T | °C | 550 | | 550 | | 51 | | 35 | | 5 | | 5 | | -50 | | -50 | |
| P | bara | 30 | | 30 | | 30 | | 30 | | 30 | | 30 | | 30 | | 30 | |
| H | kW | -310.4 | | -276.0 | | -318.8 | | -319.9 | | -168.8 | | -153.1 | | -10.3 | | -166.1 | |
| Fv | m³/hr | 11.22 | | 8.34 | | 1.53 | | 1.42 | | 1.15 | | 0.05 | | 0.18 | | 0.16 | |
| HHV(mix) | MJ/kg | | | 2.0 | | 2.0 | | 2.0 | | 1.8 | | 2.4 | | 17.8 | | 0.5 | |
| | | Mol (kmol/hr) | | Mass (kg/hr) | Mol (kmol/hr) | Mass (kg/hr) | Mol (kmol/hr) | Mass (kg/hr) | Mol (kmol/hr) | Mass (kg/hr) | Mol (kmol/hr) | Mass (kg/hr) | Mol (kmol/hr) | Mass (kg/hr) | Mol (kmol/hr) | Mass (kg/hr) | Mol (kmol/hr) |
| Flows | | 90.08 | 5.00 | 104.35 | 3.68 | 104.35 | 3.68 | 104.35 | 3.68 | 69.07 | 1.78 | 35.28 | 1.90 | 5.13 | 0.30 | 63.93 | 1.48 |
| H2 | | | | 0.31 | 0.16 | 0.31 | 0.16 | 0.31 | 0.16 | 0.31 | 0.16 | 0.00 | 0.00 | 0.30 | 0.15 | 0.01 | 0.01 |
| CO | | | | 1.05 | 0.04 | 1.05 | 0.04 | 1.05 | 0.04 | 1.05 | 0.04 | 0.00 | 0.00 | 0.78 | 0.03 | 0.27 | 0.01 |
| CO2 | | | | 68.29 | 1.55 | 68.29 | 1.55 | 68.29 | 1.55 | 66.49 | 1.51 | 1.30 | 0.04 | 3.33 | 0.098 | 63.16 | 1.44 |
| CH4 | | | | 1.20 | 0.07 | 1.20 | 0.07 | 1.20 | 0.07 | 1.20 | 0.07 | 0.00 | 0.00 | 0.72 | 0.05 | 0.47 | 0.03 |
| H2O | | 90.08 | 5.00 | 33.49 | 1.86 | 33.49 | 1.86 | 33.49 | 1.86 | 0.01 | 0.00 | 33.48 | 1.86 | 0.00 | 0.00 | 0.01 | 0.00 |
| C8H16 | | | | | | | | | | | | | | | | | |
| N2 | | | | | | | | | | | | | | | | | |
| O2 | | | | | | | | | | | | | | | | | |
| Fractions % | | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| H2 | | | | 0.3 | 4.2 | 0.3 | 4.2 | 0.3 | 4.2 | 0.5 | 8.7 | 0.0 | 0.0 | 5.9 | 50.2 | 0.0 | 0.4 |
| CO | | | | 1.0 | 1.0 | 1.0 | 1.0 | 1.0 | 1.0 | 1.5 | 2.1 | 0.0 | 0.0 | 15.2 | 9.3 | 0.4 | 0.6 |
| CO2 | | | | 65.4 | 42.2 | 65.4 | 42.2 | 65.4 | 42.2 | 96.3 | 84.9 | 5.1 | 2.2 | 64.8 | 25.3 | 98.8 | 98.9 |
| CH4 | | | | 1.1 | 2.0 | 1.1 | 2.0 | 1.1 | 2.0 | 1.7 | 4.2 | 0.0 | 0.0 | 14.1 | 15.1 | 0.7 | 2.0 |
| H2O | | 100.0 | 100.0 | 32.1 | 50.5 | 32.1 | 50.5 | 32.1 | 50.5 | 0.0 | 0.0 | 94.9 | 97.8 | 0.0 | 0.0 | 0.0 | 0.1 |
| C8H16 | | | | | | | | | | | | | | | | | |
| N2 | | | | | | | | | | | | | | | | | |
| O2 | | | | | | | | | | | | | | | | | |

FIG. 9

| Variable | Unit | F1 | | F2 | | F3 | |
|---|---|---|---|---|---|---|---|
| T | °C | 25 | | 915 | | 243 | |
| P | bara | 1 | | 1 | | 1 | |
| H | kW | 0.0 | | -10.3 | | -27.4 | |
| Fv | m³/hr | 61.98 | | 267.57 | | 116.31 | |
| HHV(mix) | MJ/kg | | | 0.1 | | 0.1 | |
| | | Mass (kg/hr) | Mol (kmol/hr) | Mass (kg/hr) | Mol (kmol/hr) | Mass (kg/hr) | Mol (kmol/hr) |
| Flows | | 7213 | 2.50 | 77.26 | 2.71 | 77.26 | 2.71 |
| H2 | | | | 0.00 | 0.00 | 0.00 | 0.00 |
| CO | | | | 0.00 | 0.00 | 0.00 | 0.00 |
| CO2 | | | | 6.54 | 0.15 | 6.54 | 0.15 |
| CH4 | | | | 0.00 | 0.00 | 0.00 | 0.00 |
| H2O | | | | 4.33 | 0.24 | 4.33 | 0.24 |
| C8H16 | | | | 0.00 | 0.00 | 0.00 | 0.00 |
| N2 | | 55.33 | 1.98 | 55.33 | 1.98 | 55.33 | 1.98 |
| O2 | | 16.80 | 0.53 | 11.07 | 0.35 | 11.07 | 0.35 |
| Fractions | % | 100.0 | 100.0 | 100.0 | 100.0 | 100.0 | 100.0 |
| H2 | | | | 0.0 | 0.0 | 0.0 | 0.0 |
| CO | | | | 0.0 | 0.0 | 0.0 | 0.0 |
| CO2 | | | | 8.5 | 5.5 | 8.5 | 5.5 |
| CH4 | | | | 0.0 | 0.0 | 0.0 | 0.0 |
| H2O | | | | 5.6 | 8.9 | 5.6 | 8.9 |
| C8H16 | | | | 0.0 | 0.0 | 0.0 | 0.0 |
| N2 | | 76.7 | 79.0 | 71.6 | 72.9 | 71.6 | 72.9 |
| O2 | | 23.3 | 21.0 | 14.3 | 12.8 | 14.3 | 12.8 |

FIG. 10

| Variable | Units | S1 | S2 | S3 | S4 | S5 | S6 | S7 | S8 | S9 | S10 |
|---|---|---|---|---|---|---|---|---|---|---|---|
| From | | B10 | HT | HT | PREREF | B16 | B7 | B9 | DEHYDPRM | B18 | DEHYDPRM |
| To | | | | PREREF | B16 | B7 | B9 | DEHYDPRM | B18 | | |
| Mass Flows | | | | | | | | | | | |
| H2 | kg/hr | 22.494 | 22.494 | 22.494 | 109.147 | 109.147 | 90.139 | 90.139 | 9.430 | 9.079 | 80.709 |
| H2 | kg/hr | | | | 1.458 | 1.458 | 9.070 | 9.070 | 9.070 | 9.070 | 0.000 |
| CO | kr/hr | | | | 0.985 | 0.985 | | | | | |
| CO2 | kg/hr | | | | 24.441 | 24.441 | | | | | |
| CH4 | kg/hr | | | | 16.253 | 16.253 | | | | | |
| H2O | kg/hr | | | | 66.010 | 66.010 | 81.069 | 81.069 | 0.360 | 0.009 | 80.708 |
| 01-Oct-01 | kg/hr | 22.494 | 22.494 | 22.494 | 0.000 | 0.000 | | | | | |
| NITRO-01 | kg/hr | | | | | | | | | | |
| ARGON | kg/hr | | | | | | | | | | |
| O2 | kg/hr | | | | 0.000 | 0.000 | | | | | |
| Mass Fractions | | | | | | | | | | | |
| H2 | | | | | 0.013 | 0.013 | 0.101 | 0.101 | 0.962 | 0.999 | 0.000 |
| CO | | | | | 0.009 | 0.009 | | | | | |
| CO2 | | | | | 0.224 | 0.224 | | | | | |
| CH4 | | | | | 0.149 | 0.149 | | | | | |
| H2O | | | | | 0.605 | 0.605 | 0.899 | 0.899 | 0.038 | 0.001 | 1.000 |
| 01-Oct-01 | | 1.000 | 1.000 | 1.000 | 0.000 | 0.000 | | | | | |
| NITRO-01 | | | | | | | | | | | |
| ARGON | | | | | 0.000 | 0.000 | | | | | |
| O2 | | | | | 0.000 | 0.000 | | | | | |

FIG. 12

| Variable | Units | W1 | W2 | W3 | W4 | W5 | SW1 | SW2 | SW3 | SW4 | SW5 |
|---|---|---|---|---|---|---|---|---|---|---|---|
| From | | B3 | B3 | B13 | B8 | B12 | | B4 | B5 | B17 | B19 |
| To | | | B13 | B8 | B12 | PREREF | B4 | B5 | B17 | B19 | B7 |
| Mass Flows | kg/hr | 86.653 | 86.653 | 86.653 | 86.653 | 86.653 | 81.069 | 81.069 | 81.069 | 81.069 | 81.069 |
| H2 | kg/hr | | | | | | | | | | |
| CO | kr/hr | | | | | | | | | | |
| CO2 | kg/hr | | | | | | | | | | |
| CH4 | kg/hr | | | | | | | | | | |
| H2O | kg/hr | 86.653 | 86.653 | 86.653 | 86.653 | 86.653 | 81.069 | 81.069 | 81.069 | 81.069 | 81.069 |
| 01-Oct-01 | kg/hr | | | | | | | | | | |
| NITRO-01 | kg/hr | | | | | | | | | | |
| ARGON | kg/hr | | | | | | | | | | |
| O2 | kg/hr | | | | | | | | | | |
| Mass Fractions | | | | | | | | | | | |
| H2 | | | | | | | | | | | |
| CO | | | | | | | | | | | |
| CO2 | | | | | | | | | | | |
| CH4 | | | | | | | | | | | |
| H2O | | 1.000 | 1.000 | 1.000 | 1.000 | 1.000 | 1.000 | 1.000 | 1.000 | 1.000 | 1.000 |
| 01-Oct-01 | | | | | | | | | | | |
| NITRO-01 | | | | | | | | | | | |
| ARGON | | | | | | | | | | | |
| O2 | | | | | | | | | | | |

FIG. 13

| Variable | Units | R1 | R2 | R3 | R4 | R5 | R6 |
|---|---|---|---|---|---|---|---|
| From | | B7 | B6 | DEHYDRET | DEHYDRET | B11 | B11 |
| To | | B6 | DEHYDRET | | | | B14 |
| Mass | kg/hr | 100.77 | 100.77 | 32.592 | 67.485 | 62.989 | 4.495 |
| Flows | kg/hr | 0.246 | 0.246 | 0.000 | 0.246 | 0.012 | 0.234 |
| H2 | kr/hr | 0.884 | 0.884 | 0.001 | 0.883 | 0.262 | 0.620 |
| CO | kg/hr | 67.449 | 67.449 | 1.740 | 65.709 | 62.424 | 3.285 |
| CO2 | kg/hr | 0.633 | 0.633 | 0.001 | 0.632 | 0.277 | 0.355 |
| CH4 | kg/hr | 30.865 | 30.865 | 30.851 | 0.014 | 0.014 | 0.000 |
| H2O | kg/hr | | | | | | |
| 01-Oct-01 | kg/hr | | | | | | |
| NITRO-01 | kg/hr | | | | | | |
| ARGON | kg/hr | | | | | | |
| O2 | | | | | | | |
| Mass Fractions | | | | | | | |
| H2 | | 0.02 | 0.02 | 0.000 | 0.004 | 0.000 | 0.052 |
| CO | | 0.009 | 0.009 | 0.000 | 0.013 | 0.004 | 0.138 |
| CO2 | | 0.674 | 0.674 | 0.053 | 0.974 | 0.991 | 0.731 |
| CH4 | | 0.006 | 0.006 | 0.000 | 0.009 | 0.004 | 0.079 |
| H2O | | 0.308 | 0.308 | 0.947 | 0.000 | 0.000 | 0.000 |
| 01-Oct-01 | | | | | | | |
| NITRO-01 | | | | | | | |
| ARGON | | | | | | | |
| O2 | | | | | | | |

FIG. 14

HYDROGEN PRODUCTION WITH MEMBRANE REFORMER

TECHNICAL FIELD

This disclosure relates to reforming of hydrocarbon to produce hydrogen.

BACKGROUND

Hydrogen gas is not found naturally on Earth. Therefore, hydrogen gas is commercially produced using a chemical or thermal process. Hydrogen may be produced from fossil fuels. Hydrogen is produced by coal gasification, biomass gasification, water electrolysis, or the reforming or partial oxidation of natural gas or other hydrocarbons. The produced hydrogen can be a feedstock to chemical processes, such as fuel cells, ammonia production, aromatization, hydrodesulphurization, and hydrogenation or hydrocracking of hydrocarbons.

The reforming of natural gas is the most prevalent source of hydrogen production. The reforming of natural gas to produce hydrogen can include steam reforming of natural gas. Bulk hydrogen is typically produced by the steam reforming of natural gas (methane). Conventional steam reforming includes heating the natural gas (e.g., to between 700° C. to 1100° C.) in the presence of steam and a nickel (Ni) catalyst. This endothermic reaction generates carbon monoxide (CO) and hydrogen (H2). The carbon monoxide gas can be subjected to a water-gas shift reaction to obtain additional hydrogen.

SUMMARY

An aspect relates to a method of producing hydrogen, including feeding hydrocarbon and steam to a pre-reformer having a pre-reforming catalyst, and converting hydrocarbon to methane via the pre-reforming catalyst in the pre-reformer to give a pre-reformed intermediate that is a methane-rich mixture. The method includes feeding the pre-reformed intermediate to a membrane reformer vessel having reforming catalyst and a tubular membrane, and converting methane in the pre-reformed intermediate to hydrogen and carbon dioxide by steam reforming via the reforming catalyst in the membrane reformer in a region in the vessel external to the tubular membrane. The region is a retentate side of the tubular membrane. The method includes diffusing the hydrogen from the region through the tubular membrane (hydrogen selective) into a bore of the tubular membrane. The bore is a permeate side of the tubular membrane.

Another aspect is a system for hydrogen production, including a pre-reformer to receive hydrocarbon and convert the hydrocarbon to methane via a pre-reforming catalyst. The system includes a membrane reformer to receive the methane from the pre-reformer. The membrane reformer includes a reforming catalyst in a vessel to convert the methane by steam reforming into hydrogen and carbon dioxide. The membrane reformer includes a tubular membrane (hydrogen selective) in the vessel to diffuse the hydrogen through the tubular membrane to a bore of the tubular membrane. The bore is a permeate side of the tubular membrane. The membrane includes the vessel having a region in the vessel and external to the tubular membrane for the steam reforming. The region is a retentate side of the tubular membrane. The reforming catalyst is disposed external to the tubular membrane.

Yet another aspect relates to system for hydrogen production, including a pre-reformer to receive hydrocarbon and convert the hydrocarbon to methane via a pre-reforming catalyst. The system includes a membrane reformer to receive the methane from the pre-reformer, the membrane reformer including a vessel, a reforming catalyst in the vessel to convert the methane into hydrogen and carbon dioxide, and a tubular membrane (hydrogen selective) in the vessel to diffuse the hydrogen through the tubular membrane to a bore of the tubular membrane. The bore is a permeate side of the tubular membrane. The system for hydrogen production includes a hydrogen purification system to process permeate from the bore of the tubular membrane to give hydrogen product comprising at least 99.9 mole percent hydrogen. The hydrogen purification system includes a condenser heat exchanger, a vessel having adsorbent, or an electrochemical compressor, or any combinations thereof.

The details of one or more implementations are set forth in the accompanying drawings and the description below. Other features and advantages will be apparent from the description and drawings, and from the claims.

BRIEF DESCRIPTION OF DRAWINGS

FIG. 5 is a legend associated with FIG. 4.

FIGS. 6-10 are tables of mass balance data and stream information generated with the ASPEN model for the schematic flow diagram of FIG. 4.

FIGS. 12-14 are tables of mass balance data and stream information generated with the ASPEN model for the schematic flow diagram of FIG. 11.

DETAILED DESCRIPTION

Figure 1:
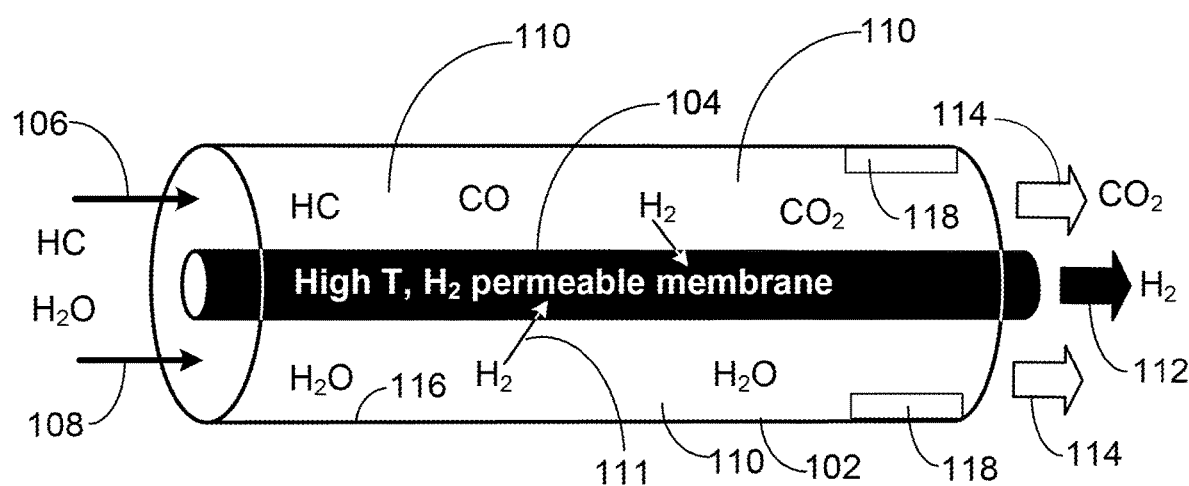
FIG. 1 is a simplified perspective view of a catalytic membrane reformer.

Some aspects of the present disclosure are directed to a catalytic membrane reactor with a hydrogen selective membrane to produce hydrogen. The membrane may facilitate to increase both the yield and recovery of hydrogen from an equilibrium-limited reaction such as steam methane reforming. The source of heat for the endothermic reforming reaction may be electrical heaters. The membrane reactor may operate at lower temperature compared to conventional steam-methane reforming. Utilization of the hydrogen selective membranes may give production of high purity hydrogen and also a concentrated capture-ready carbon dioxide for applications or sequestration.

A prevalent large-scale route to produce hydrogen is steam methane reforming (SMR) of natural gas at high temperature (e.g., 800° C. to 900° C.) and high pressure (e.g., 15 bar to 50 bar) via a nickel-based catalyst in alloy tubes in a furnace. The providing of heat to drive this reforming reaction (highly endothermic) can be problematic and lead to lower efficiency. Steam generation may be integrated with the furnace to increase overall thermal efficiency. The conventional SMR is typically optimized for large-scale hydrogen production and generally does not scale down effectively for small-scale hydrogen production. The rate of the endothermic SMR reaction is often limited by external heat transfer into the reactor, which is why conventional industrial steam-methane reforming catalyst tubes are typically located inside large box furnaces fired by burning hydrocarbon fuels. These furnaces may consume at least a third of the feedstock (e.g., natural gas) making the process less efficient and resulting in the emission of relatively large amounts of carbon dioxide ($CO_2$). Furthermore, the efficiency of the large-scale industrial SMR process depends on turning the waste heat from the furnace exhaust into steam for use in other areas of the plant or facility. Such makes the process less efficient when scaled down for applications that have no use for the waste heat that is generated. In this instance, the waste heat is dissipated, often with active cooling that consumes even more energy.

Some aspects of the present disclosure are directed to a membrane reformer system for production of hydrogen that is free of $CO_2$ (or substantially free of $CO_2$). The system can have a relatively low capacity, such as a hydrogen production rate in the range of 10 normal cubic meter per hour ($Nm^3/hr$) to 8,000 $Nm^3/hr$, or in the range of 200 $Nm^3/hr$ to 10,000 $Nm^3/hr$, and the like. The process can also include $CO_2$ capture and liquefaction. The feed for the reforming can be a diverse range of hydrocarbon feeds including liquid hydrocarbons in particular. This membrane reformer process may involve the production of $CO_2$-free hydrogen from fossil feedstocks utilizing high-temperature hydrogen selective membranes (e.g., palladium or palladium alloy membranes). The membrane reformer system can include both low-temperature steam reforming and dry-reforming catalyst integrated in a single membrane reactor. The system may be an integrated process for the production of $CO_2$-free hydrogen from hydrocarbon feedstocks, such as natural gas, methane ($CH_4$), mixture of hydrocarbons (C1 to C5), liquefied petroleum gas (LPG), crude oil, crude oil cuts (e.g., naphtha, kerosene, etc.), and processed crude-oil cuts (e.g., gasoline, diesel, etc.). In implementations, the membrane reformer system can generate hydrogen from carbon-containing synthetic fuels such as methanol, ethanol, and dimethyl ether.

The membrane reformer may be heated electrically. An electrical heating system may provide the energy for reforming and avoiding burning of fuel for the energy and steam generation. In implementations, renewable electricity can be utilized for the electrical heaters to provide energy for the membrane reformer process.

The membrane reformer system generates hydrogen via the reforming and contemporaneously membrane-separates the hydrogen (as permeate), and may compress (e.g., via an electrochemical compressor or conventional compressor) the separated hydrogen for delivery pressures. The membrane reformer system produces $CO_2$ via the reforming and separates the $CO_2$ in-situ (as membrane retentate), and may liquefy the $CO_2$ downstream of the membrane reformer for application or disposal.

Conventional hydrogen-production reforming systems consist of a steam reformer, a water-gas shift converter, and a pressure swing adsorption (PSA) system. This conventional process may discharge hydrogen, for example, at a temperature of about 900° C. and a pressure in the range of 8 bar to 40 bar. The hydrocarbon feed (typically natural gas) is introduced to the steam-reforming catalyst bed in the steam reformer. In the reformer bed, steam reforming of natural gas occurs on nickel-based catalyst at a temperature in a range of about 1123 Kelvin (K) to 1223 K. This steam reforming reaction reacts methane with steam (water $H_2O$) includes $CH_4+H_2O \rightleftharpoons CO+3H_2$. The synthesis gas ($H_2$ and CO) generated by the steam reformer is supplied to a water-gas shift converter where CO is converted to $CO_2$ by reaction with steam on catalyst. This water-gas shift reaction may be represented as $CO+H_2O \rightleftharpoons CO_2+H_2$ at a temperature, for example, in a range of about 523 K to 650 K. This reversible shift reaction is mildly exothermic and generally has multiple stages with inter-stage cooling for achieving higher conversions. The produced hydrogen through the reforming reaction and shift-gas reaction is purified in the PSA system. The $CO_2$ capture in the production of $CO_2$-free hydrogen in conventional steam reforming involves capturing $CO_2$ from two sources: (1) the reformed gas (e.g., $CO_2$ concentration of about 15 to 18 mole percent); and (2) flue gases (e.g., $CO_2$ concentration of about 6 to 10 mole percent) from the reformer furnace.

Water gas reaction is mildly exothermic with high kinetic rates at higher temperatures. Hence, conventional cases may involve at least two adiabatic stages. First, the reaction may be high temperature shift (HT-WGS) where benefit of high temperature is taken to shift at high rate but the equilibrium conversion is lower. Second, the product gas from HT-WGS is cooled to lower temperatures and thus realizes the advantage of higher equilibrium in converting most of the CO. Yet, a disadvantage in conventional processes is the concentrations of CO are typically low because reforming gas volumes are carried through WGS reactors.

In contrast, in present membrane reactors: (a) the conversion of hydrocarbon to CO and $H_2$ is generally high in the reforming reaction; and (b) $H_2O$ is used in conversion and most of the $H_2$ is removed (no thermodynamic conversion limitation). WGS kinetic is high under elevated temperatures (above 250° C.) and the WGS conversion of CO generally may happen at faster rate in the membrane reactor than conventional.

Embodiments of the present process include reforming that is accompanied by hydrogen separation through hydrogen-selective membranes leaving under pressure a retentate containing primarily $CO_2$ but also water vapor, unconverted methane, CO, and the remaining hydrogen. Thus, the process is hydrogen generation by steam reforming, and with hydrogen separation and $CO_2$ capture via high-temperature hydrogen membranes.

FIG. 1 indicates a membrane reformer practice where a hydrogen-selective membrane is integrated with a reforming catalyst bed. The hydrogen-selective membrane facilitates to continuously remove hydrogen as the hydrogen is being produced. The simultaneous hydrogen generation and separation eliminates or reduces the limitation of thermodynamic equilibrium. The reaction can be performed at lower temperature (e.g., 773 K to 873 K) compared to the temperature (e.g., 1123 K to 1223 K) in conventional steam reforming. This process intensification of the present membrane-reformer system can combine reaction, separation, and purification (e.g., initial purification) in a single unit. The CO generated in the reforming can be converted to $CO_2$ in the membrane reformer. The process intensification can perform the water-gas shift reaction in the membrane reformer. With excess $H_2O$, the overall reaction proceeds to $CO_2$ and $H_2$ ($CH_4+2H_2O \rightleftharpoons CO_2+4H_2$) and additionally with lower temperatures, water-gas shift reaction converts $CO+H_2O \rightleftharpoons CO_2$ and $H_2$ in the membrane reformer.

In implementations, the membrane reformer system can be configured more compact and efficient than the conventional SMR process. Another advantage of the membrane reformer system can be generally the high concentration of CO2 in the retentate, which may reduce the energy and cost penalty associated with CO2 capture. The concentration of CO2 in the retentate on a dry basis may be as high as 90 mole percent or greater.

FIG. 1 is a simplified perspective view of a catalytic membrane reformer 100 (reactor) including a vessel 102 and a hydrogen-selective tubular membrane 104 disposed in the vessel 102. Numerical values can be associated with "hydrogen selective." The membrane 104 selectivity towards hydrogen is typically greater than 1000 (dimensionless—a ratio of the same parameter) with selectivity being the ratio of hydrogen flux to the flux of other gases, e.g., nitrogen (N2), through the membrane 104. The hydrogen-selective tubular membrane 104 (and analogous hydrogen-selective tubular membranes discussed with respect to subsequent figures) may be hydrogen selective in having a hydrogen flux of at least 250 standard cubic feet per hour per square feet (SCFH/ft$^2$) @100 pounds per inch (psi) ΔP H2 partial pressure at 400° C. The hydrogen-to-nitrogen selectivity can be a flux ratio of at least 50 at 300° C. and a transmembrane pressure of 5 bar.

The vessel 102 may be a cylindrical or tubular vessel. The vessel 102 may have a horizontal orientation (as depicted) or a vertical orientation.

The tubular membrane 104 may share a longitudinal axis or central axis with the vessel 102, as depicted. The tubular membrane 104 may be disposed concentrically in the vessel 102, as depicted. Other configurations are applicable. The membrane reformer 100 may have multiple tubular membranes 104 disposed in the vessel 102. For instance, multiple tubular membranes 104 may be disposed parallel (sharing the same longitudinal axis) in the vessel 102.

In operation, hydrocarbon 106 and steam 108 are fed to the vessel 102. The hydrocarbon 106 is subjected to steam reforming via a reforming catalyst (not shown) in the vessel 102 to generate hydrogen and carbon dioxide in the vessel 102. In some implementations, the steam reforming may primarily generate synthesis gas (CO and H2). Water-gas shift reaction with the presence of the steam converts CO to CO2 and H2. With greater stoichiometric amounts of water or steam fed to the reformer 100, the overall reaction can more directly go to CO2 and H2 with intervening CO generated in some conditions.

In certain implementations, the catalyst in the membrane reformer includes a layered catalyst with steam reforming catalyst and water-gas shift reaction catalyst. With this layered catalyst and lower operating temperatures (e.g., compared to conventional SMR), the water-gas shift has higher equilibrium conversion (and is mildly exothermic reaction): $CH_4 + H_2O = CO + 3H_2$ and $CO + H_2O = CO_2 + H_2$ giving overall reaction $CH_4 + 2H_2O = CO_2 + 4H_2$.

The steam reforming reaction (including any water-gas shift reaction) occurs in the region 110 in the vessel 102 external to the tubular membrane 104. This region 110 may be labeled as a reaction space and is the retentate side of the tubular membrane 104. The description of "steam reforming reaction" in the present membrane reformer 100 can be understood to include conversion of CO to CO2 in certain circumstances.

As the steam reforming reaction occurs and the hydrogen is being formed, the hydrogen diffuses 111 (permeates) through the tubular membrane 104 wall into the bore of the tubular membrane 104. The wall of the tubular membrane 104 is the membrane, i.e., the membrane material (e.g., palladium or palladium alloy). The bore is the interior space of the tubular membrane 104 and may be labeled as a lumen. The bore of the tubular membrane 104 is the permeate side of the tubular membrane 104.

This process intensification in the same unit (reformer 100) includes the reaction (reforming reaction) via catalyst to produce hydrogen, separation of hydrogen from the carbon dioxide via the membrane 104, and purification of the hydrogen by the separation via the membrane 104.

Permeate 112 rich in hydrogen discharges from the bore of the tubular membrane 104 and from the reformer 100. The permeate 112 may be, for example, at least 90 mole percent (mol %) hydrogen, at least 99.99 mol %, or at least 99.999 mol %. If a sweep gas is employed (as discussed below), these reported mole percentages of the permeate 112 (as discharged from the bore of the membrane 104) may be on a basis free of sweep gas (sweep-gas-free basis). In one implementation, permeate 112 discharges at a temperature in range of 500° C. to 600° C. (e.g., about 550° C.), or less than 600° C. or less than 550° C., under a pressure in a range of 1 bar to 6 bar, a range of 2 bar to 4 bar, or a range of 2 bar to 3 bar.

Retentate 114 rich in carbon dioxide (CO2) discharges from the reformer 100 from the vessel 102 region 110 (reaction space) around and external to the tubular membrane 104. The CO2-rich retentate 114 may generally contain less than 10 mol % of the combination of hydrogen and carbon monoxide. The CO2-rich retentate 114 may generally be at least 90 mol % CO2 making the retentate 114 ready in certain instances for further compression for geological sequestration or enhanced oil recovery (EOR), or for further purification so that the CO2 can be used as a feedstock for another process. Steam in the retentate 114 may be condensed and removed.

In embodiments, a sweep gas (e.g., steam or nitrogen) is provided to the bore of the tubular membrane 104 to flow through the bore to displace the permeate (hydrogen) from the bore and from the reformer 100. This displacement of hydrogen may maintain or increase driving force for hydrogen permeation through the tubular membrane 104 wall from the region 110 (reaction space) external to tubular membrane 104 to the bore. In some embodiments, the sweep gas may be provided and flow in a countercurrent direction with respect to the entering flow direction of the feed of hydrocarbon 106 and steam 108. The permeate 112 may discharge from the end (hydrocarbon-feed end) opposite the end that the retentate 114 discharges from the reformer 100.

In cases where a sweep gas is employed, the hydrogen purity of the permeate 112 may be reported on a sweep-gas-free basis in some instances. If steam is utilized as the sweep gas, the hydrogen purity of the permeate 112 may be reported on a dry basis. The steam (water) may be readily removed from the permeate 112 downstream of the membrane reformer 104. See, for example, the downstream purification system 214 (dehydration and polishing) of FIG. 2. The system 114 dehydration removes sweep steam and the system 114 polishing removes any components other than H2 that may permeate through the membrane in the membrane reformer 104. However, as indicated, the membrane may be very hydrogen-selective and thus significant amounts of components other than H2 (and sweep gas to the bore if employed) are generally not expected in the permeate 112.

If N2 is utilized as the sweep gas, the hydrogen purity of the permeate 112 may be reported on a N2-free basis in some embodiments. In particular instances, N2 may be employed as a sweep gas for the permeate 112 (hydrogen and nitrogen) routed further for ammonia synthesis. In contrast, for mobility applications of the membrane reformer system 100, N2 as a sweep gas may be generally avoided in certain cases.

Heat may be provided for the reforming reaction in the vessel 102 by electrical resistive heaters (not shown) disposed in the vessel 102. The resistive heaters disposed in the vessel 102 may be labeled as internal heaters. In some embodiments, the resistive heaters are electrical cartridge heaters. Cartridge heaters are heating elements typically having a cylindrical shape. The cartridge heater (heating element) or other electrical resistive heaters may include a sheath that is an outer metal enclosure (e.g., stainless steel). The resistive heater (heating element) may include an insulator and a wire coil (as the heater) that is metal. The heater wire coil may be a metal alloy, such as an alloy of nickel and chromium, or other metal alloy. In operation, an alternating current may be passed through the resistive wire coil in the resistive heater to generate resistive heating by the wire coil. This heat energy is transferred from the wire into the metal sheath and then the surrounding area via conduction. Electrical resistive heaters may provide for a reformer 100 operating temperature up to 800° C. or greater, or at least 550° C. or at least 600° C. In operation, the reformer 100 operating temperature may be in a range of 450° C. to 650° C., or less than 700° C., less than 600° C., or less than 550° C.

Heat may be provided for the reforming reaction by a heat source external to the vessel 102 in addition to or in lieu of internal resistive heaters. For example, electrical heaters (not shown), such as electrical band heaters or strip heaters, may be disposed on the external surface of the vessel 102. In another example, the vessel 102 may be disposed in a furnace to receive heat from the furnace as the external heat source. In particular implementations, the hydrocarbon and steam in route to the membrane reformer may be heated via heat exchangers or electrical heaters.

As discussed, example operating temperatures of the reformer 100 at which the reforming reaction may occur can be less than 600° C., or less than 550° C. The operating pressure in the reaction space 110 in the vessel 102 may be, for example, in the range of 20 bar to 50 bar or in the range of 30 bar to 40 bar, or at least 15 bar, at least 25 bar, or at least 35 bar.

The reforming catalyst (not shown) for the steam reforming of the hydrocarbon 106 is disposed in the vessel 102. The reforming catalyst may be disposed generally in the annulus volume (region 110) between the tubular membrane 104 and the vessel 102 wall. The reforming catalyst may be disposed on the internal surface 116 of the vessel 102 wall. The reforming catalyst may be a coating or in structured form (e.g., metal foam). In certain embodiments, the reforming catalyst is not in contact with the tubular membrane 104. In some implementations, the reforming catalyst may be disposed on the internal resistive heaters (if employed). Thus, in those implementations, the internal resistive heaters (e.g., cartridge heaters) may readily and directly heat (via contact) the reforming catalyst to promote and advance the reforming reaction.

A dry reforming catalyst 118 can be disposed in the membrane reformer 100 around the tubular membrane 104 at the exit portion of the membrane reformer to resist carbon formation and coking in the CO2 rich environment. The dry reforming catalyst may be a catalyst that provides for resistance to coking and sintering.

Figure 2:
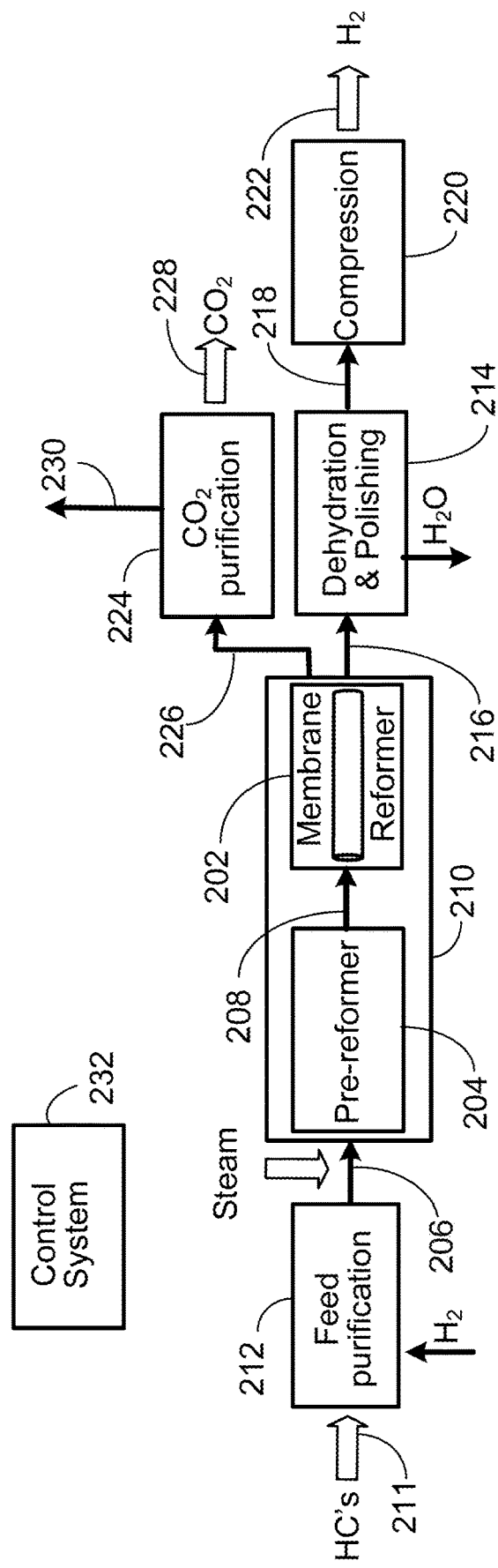
FIG. 2 is a block flow diagram of a membrane reformer system.

FIG. 2 is a block flow diagram of a membrane reformer system 200 for hydrogen production. The membrane reformer system 200 may be labeled as a hydrogen production system. In certain embodiments, the hydrogen production capacity of the membrane reformer system 200 is in the range of 20 Nm3/hr to 10,000 Nm3/hr. In other embodiments, the hydrogen production capacity is greater than 10,000 Nm3/hr.

As discussed below, a hydrogen-selective membrane(s) (e.g., palladium alloy based) is integrated with high-activity steam-reforming catalyst, such as for an operating temperature in the range of 500° C. to 600° C. In some embodiments, CO2-free hydrogen production (or substantially CO2-free) is implemented utilizing liquid hydrocarbon feedstocks (e.g., final boiling point of 630 K, at least 630 K, or less than 630 K). As discussed below, the liquid hydrocarbons prior to reforming may be treated for sulfur removal (and other impurities removal).

The tubular membrane (e.g., palladium-alloy membrane) may remove hydrogen produced from the reforming reaction environment providing for increasing hydrocarbon conversion in a single unit. The generated hydrogen may be separated (removed from the reaction space into the bore of the tubular membrane) contemporaneous with generation of the hydrogen in the same (single) unit.

The high purity hydrogen recovered on the membrane permeate side may be further compressed to a delivery pressure, for example, in the range of 350 bar to 750 bar via a hydrogen compressor (e.g., mechanical compressor, multi-stage compressor, electrochemical compressor, ionic compressor, metal hydride compressor, etc.). This relatively high-efficiency process may be suited for distributed type applications, such as on-site hydrogen generation for hydrogen refueling stations, and the like.

In implementations, the retentate is CO2 at high concentrations (e.g., greater than 85 mol % or greater than 90 mol %) with balance H2O, CO, CO2, H2 and CH4. Thus, in some embodiments, CO2 capture may be indirect via separation of the other components (balance) through CO2 liquefaction and then recycle of the non-CO2 stream. The separated and liquefied CO2 may be transported for sequestration or CO2 conversion applications. The present hydrogen production system based on a membrane reformer may give efficient CO2 capture (whether characterized as indirect or direct) that can contribute to reducing CO2 footprint.

Unit operations in the membrane reformer system 200 may be for the conversion of liquid hydrocarbon (e.g., heavy naphtha) to hydrogen and may include: (1) hydrodesulfurization to reduce sulfur in the hydrocarbon (fuel), e.g., to less than 0.1 part per million (ppm); (2) pre-reforming of desulfurized hydrocarbon fuel to produce methane rich reformate; (3) steam reforming of methane-rich reformate, along with hydrogen separation, in a membrane reformer to produce hydrogen (of relatively high purity) and a concentrated CO2-rich stream; (4) CO2 capture; (5) hydrogen polishing to convert or remove any hydrocarbons or CO in the hydrogen discharged from the membrane reformer to produce high-purity hydrogen (e.g., 99.999 mol % hydrogen); and (6) hydrogen compression per the downstream demand or user application.

The membrane reformer system 200 includes a membrane reformer 202. Aspects of the membrane reformer 202 may resemble aspects of the catalytic membrane reformer 100 of FIG. 1. The membrane reformer 202 (membrane reforming unit) contains a high-temperature tubular hydrogen-separation membrane (e.g., a palladium alloy membrane) that selectively allows hydrogen to pass from the high pressure side to permeate low-pressure side. The membrane reformer 202 can be operated between 300° C. and 700° C., more specifically between 400° C. and 600° C. and at pressure between 8 bar and 50 bar, more specifically between 10 bar and 40 bar. For certain operation (and that can be beneficial or optimized operation), the membrane reformer 202 may operate at the same or similar conditions (temperature, pressure) of the upstream pre-reformer 204.

The membrane reformer 202 includes a vessel (e.g., stainless steel) which may be a cylindrical vessel. The vessel may be a pressure vessel per a formal standard or code, such as the American Society of Mechanical Engineers (ASME) Boiler & Pressure Vessel Code (BPVC) or the European Union (EU) Pressure Equipment Directive (PED).

As mentioned, the membrane reformer 202 includes a hydrogen-selective tubular membrane in the vessel. The membrane reformer 202 may include multiple tubular membranes (hydrogen selective) in the vessel. In certain implementations, the tubular membrane may be situated concentrically in the vessel (if the vessel is cylindrical). The tubular membrane may be labeled as a cylindrical membrane, hollow membrane, and so on. The wall of the tubular membrane is the membrane, i.e., the membrane material. The bore (lumen) of the tubular membrane is the interior cavity (e.g., cylindrical cavity) of the tubular membrane and defined by the wall (membrane or membrane material) of the tubular membrane. The material of the hydrogen-selective tubular membrane may be, for example, a palladium alloy. The bore is the permeate side of the tubular membrane.

In operation, the membrane reformer 202 may receive hydrocarbon (e.g., methane) in a methane-rich mixture 208 from a pre-reformer 204 that is converted via reforming catalyst in the membrane reformer 202 into hydrogen and carbon dioxide. The membrane reformer 202 may receive steam from the pre-reformer 204. The methane-rich mixture 208 may be labeled as a pre-reformed intermediate or methane-rich reformate. The methane and any other hydrocarbon in the methane-rich mixture 208 may be converted to H2 and CO2 in the reformer 202. The methane-rich mixture 208 entering the reformer 202 may include, for example, H2, CO, CO2, and N2. Again, steam may flow in the methane-rich mixture 208 from the pre-reformer 204 to the reformer 202. In addition, steam or supplemental steam may be added via a steam conduit (from an external steam supply source) directly to the membrane reformer 202 or to a feed conduit to the membrane reformer 202. Supplemental steam may be added in certain instances, for example, to increase the steam-to-carbon ratio in the reformer 202 to increase conversion of methane or to avoid (or reduce) carbon deposition, and the like.

The hydrogen (generated by the reforming reaction) in the membrane reformer 202 may pass through the tubular membrane wall into the bore (interior cavity or lumen) of the tubular membrane. Again, the bore of the tubular membrane is the permeate side of the membrane. The permeate hydrogen may be collected as product from the bore. The reformer 202 vessel volume-space external to the tubular membrane is the retentate side of the tubular membrane 204. The produced carbon dioxide may discharge from the reformer 202 vessel from the retentate side.

The membrane reformer 202 includes a reforming catalyst (reforming catalyst bed) in the reformer 202 vessel. The reforming catalyst (e.g., nickel-based catalyst) may be situated in a region between the vessel wall and the tubular membrane. The reforming catalyst may be disposed (e.g., coated or in structured form) on the inside surface of the vessel wall. In implementations, the reforming catalyst is not in contact with the tubular membrane. The reforming reaction (via the reforming catalyst) in the reformer 202 is generally operationally cohesive with the hydrogen separation via the tubular membrane in the reformer 202.

The reforming catalyst as a steam reforming catalyst may be, for example, primarily Ni-based to reduce cost. In implementations, the membrane reformer 202 (reactor) in operation may generally become membrane-limited before or instead of heat-input limited as are conventional steam-reformer systems. Thus, the amount of catalyst may be typically less in the present membrane reformer 202 and also noble metal-based catalysts can more readily be utilized. This may be a benefit of the present process intensification through membrane integration with the catalyst.

In embodiments, the exit portion of the membrane reformer 202 may be where a majority of the hydrogen is separated and removed by the membrane and where steam is reacted with hydrocarbon resulting in higher concentrations of carbon species (e.g., CH4, CO2, and CO). Thus, additionally a dry reforming catalyst can be packed around the tubular membrane at the exit portion of the membrane reformer 202 to resist carbon formation and coking in the CO2 rich environment. The dry reforming catalyst (e.g., nickel-molybdenum (Mo) based) may be a catalyst that provides for resistance to coking and sintering. Dry reforming catalyst (example Ni-MO on MgO support) may provide coking and sintering resistance in the high carbon concentration regimes. Thus, the dry reforming catalyst may aid in avoiding or reducing coking on the tubular membrane surface or on the catalyst (e.g., catalyst coated on the inside surface of the vessel wall of the membrane reformer 202).

As the hydrocarbon reforming is endothermic, the membrane reformer 202 is supplied with external energy to maintain operating temperature of the reformer 202 at a desired level. The external energy can be provided through electrical heating, a nearby heat source via a secondary heat loop, or through direct heating via a furnace.

In embodiments, electrical heaters may be disposed in or on the reformer 202 vessel to provide heat for the endothermic reforming reaction. The electrical heaters may be electrical resistive heaters. The heaters if employed inside the vessel may be, for example, electrical cartridge heaters, electrical tubular heaters, etc. The heaters if disposed on the outer surface of the reformer 202 vessel may include, for example, electrical band heaters, electrical strip heaters, electrical plate heaters, etc. In some embodiments, thermal insulation may be disposed on reformer 202 vessel to reduce heat transfer from the reformer 202 to the ambient environment (to conserve heat in the reformer 202) and provide for personnel protection.

In order to promote the hydrogen transport across the tubular membrane, the permeate side may be maintained at lower pressure (than the retentate side external to the tubular membrane) and at a lower partial pressure of hydrogen on the permeate side (via utilizing a sweep gas, as discussed below). The presence of sweep gas reduces the percent hydrogen in permeate discharged from the tubular membrane. Yet, with the sweep gas as steam, the steam (H2O) can be condensed and removed such that the hydrogen concentration becomes at least 95 mol %, at least 99 mol %, or approach 100 mol % pure hydrogen. The hydrogen concentration in the permeate on a permeate dry basis may be at least 95 mol %, at least 99 mol %, at least 99.99 mol %, or at least 99.9999 mol % (approach 100 mol % pure hydrogen). Again, with steam as the sweep gas, the steam (water) in the permeate may be relatively easily removed by condensing the water in implementations. Typical permeate pressure can be between 0.5 bar and 10 bar, more specifically between 1 bar and 3 bar.

On the retentate side, the remaining hydrogen as well as the generated CO2, unconverted CH4, any CO, and unconsumed water vapor exit the membrane reformer 202 as retentate 226 at the pressure and temperature of the membrane reformer operation, e.g., between 8 bar and 50 bar, or between 10 and 40 bar, and between 300° C. and 700° C., or between 400° C. and 600° C.

The membrane reformer system 200 may include a pre-reformer 204 that receives hydrocarbon, such as naphtha. The pre-reformer 204 is typically fed with steam to crack (in the presence of pre-reforming catalyst) the long hydrocarbon molecules into methane. Different catalysts are developed to pre-reform different types of hydrocarbon feeds. The pre-reformer 204 may operate between 300° C. and 650° C., or between 400 and 600° C., and between 8 bar and 50 bar, or between 10 bar and 40 bar. The methane-rich stream generated in the pre-reformer is further reformed in the membrane reformer 202 (membrane reforming unit) having reforming catalyst to reform the methane into hydrogen and CO2. As discussed, a hydrogen selective membrane is integrated with the catalyst in the membrane reformer 202 to separate the hydrogen contemporaneous with the hydrogen being generated via the reforming reaction in the membrane reformer 202.

The pre-reformer 204 may be a vessel having a pre-reforming catalyst to convert higher molecular-weight hydrocarbons 206 to methane. A feed conduit may flow the feed hydrocarbons 206 to the pre-reformer 204. A steam conduit may flow steam to the pre-reformer 204. In implementations, the steam conduit may introduce the steam into the hydrocarbons 206 flowing in the feed conduit to the pre-reformer 204. As mentioned, the pre-reformer 204 may discharge methane in a methane-rich fluid 208 to the membrane reformer 202. In implementations, steam also flows from the pre-reformer 204 to the membrane reformer 202. The hydrocarbons 206 fed to the pre-reformer 204 may be liquid hydrocarbons, e.g., with a final boiling point of at least 630 K. The hydrocarbons 206 may be condensates from natural gas stream (C5-C6 hydrocarbons), liquefied petroleum gas (LPG), naphtha, kerosene, diesel oil, heavier oils, other refined petroleum products, natural gas, or mixture of hydrocarbons (C1 to C5). The catalyst in the pre-reformer 204 may be a bed (e.g., packed bed) of pre-reforming catalyst. The catalyst in the pre-reformer 204 may be a nickel-based catalyst, noble-metal based catalyst, transition-metal based catalyst, etc. As indicated, the system 200 may include a conduit to introduce steam with the hydrocarbons 206 into the pre-reformer 204. In operation, the hydrocarbons 206 and steam react in presence of the pre-reforming catalyst to generate methane. The reaction in the pre-reformer 204 may generate reformate including primarily methane. As discussed, the operating temperature in the pre-reformer 204 may be, for example, in the range of 500° C. to 600° C. In embodiments, electrical heaters (e.g., resistive heaters) may be dispose in or on the pre-reformer 204 vessel to provide heat for the reaction. On the other hand, the pre-reformer 204 vessel may be insulated (thermal insulation) without electrical heaters. The pre-reforming reaction may operate in adiabatic mode under targeted operating conditions generally not utilized additional heat other than heating the feed to input temperatures and providing sufficient thermal insulation to avoid heat loses. The operating pressure in the pre-reformer 204 may be, for example, in the range of 10 bar to 50 bar.

An implementation can be to have the pre-reformer 204 and membrane reformer 202 integrated in operation in one single reactor-unit as an integrated pre-reformer/membrane reformer 210. The inlet part of the membrane reformer 202 reactor vessel has a packed-bed catalyst configuration with pre-reforming catalyst as the pre-reformer 204. A second part of the reactor vessel has hydrogen selective membrane (s) along with steam reforming catalyst packed around the membrane in structural form (coated on reactor walls or mesh coated with catalyst wrapped around the membrane) as the membrane reformer 204. Thus, for certain embodiments, the membrane reformer 202 and the pre-reformer 204 may be combined in a single unit that is an integrated pre-reformer/membrane reformer 210. The reformer 202 and pre-reformer 204 may be an integrated pre-reformer/membrane reformer 210. See, e.g., FIG. 3. Such may provide for efficiency of operation and reduced capital cost. As integrated, the membrane reformer 202 and the pre-reformer 204 may share the same vessel of the integrated pre-reformer/membrane reformer 210. In some implementations, the interconnecting piping and control features between the pre-reformer 204 and the membrane reformer 202 as separate units may be reduced or eliminated with the integrated unit 210.

The hydrocarbon feed 211 may be compressed to a pressure between 8 bar to 50 bar (or between 20 and 40 bar) and fed to the membrane reformer system 200. In embodiments, the feed hydrocarbon 211 may be naphtha, kerosene, diesel oil, heavier oils, or other refined petroleum products. The feed hydrocarbon 211 may include, for example, natural gas, methane, liquefied petroleum gas (LPG), or a mixture of C1-C6, or any combinations thereof. The LPG may include, for example, propane and butane. The feed hydrocarbon 211 may include organic sulfur compounds, such as thiols, thiophenes, organic sulfides disulfides, etc.

The compressed hydrocarbon feed 211 may be fed a sulfur-removal unit (hydrodesulfurization unit in a feed purification system 212) to remove sulfur compounds. Sulfur compounds can be poisonous to the catalysts used in the pre-reformer 204 or the membrane reformer 202. Hydrogen is fed to the sulfur removal unit to hydrogenate the sulfur compounds to remove the sulfur from the hydrocarbon feed 211. Typically, the sulfur removal unit may operate, for example, at temperatures between 250° C. and 450° C. and pressures between 1 bar and 50 bar (or 20 bar and 40 bar). The sulfur-free hydrocarbon feed 206 (e.g., less than 1 ppm sulfur) leaves the sulfur removal unit and is fed to the pre-reformer 204. In general, the membrane reformer system 200 may include a feed purification system 212 to perform at least hydrodesulfurization on the feed hydrocarbon 211. As indicated, the feed purification system 204 may include a hydrodesulfurization unit that removes sulfur (S) from the feed hydrocarbon 211 to give the treated feed hydrocarbon 206 having, for example, less the 0.1 part per million (ppm) of sulfur. The hydrodesulfurization unit may discharge the removed sulfur as hydrogen sulfide (H2S) in a discharged sour gas.

The hydrodesulfurization unit may include a catalytic reactor, such as a fixed-bed reactor that is a reactor vessel having a fixed bed(s) of catalyst. In operation, the fixed-bed reactor may convert sulfur compounds in the hydrocarbon feed to H2S for ease of removal. In implementations, the fixed-bed reactor may be characterized as a hydrotreater that performs hydrogenation. In operation for some implementations, the hydrocarbon feed 211 may be pre-heated (e.g., in a heat exchanger) and fed to the fixed-bed reactor. Hydrogen is also fed to the fixed-bed reactor for the hydrodesulfurization as a hydrogenation reaction. In particular embodiments, the source of the hydrogen can be the membrane reformer reactor 202. The catalyst in the fixed bed may be hydrodesulfurization catalyst. For example, the hydrodesulfurization catalyst may be molybdenum disulfide (MoS) or tungsten. For instance, the catalyst may be based on MoS supported on γ-alumina. The catalyst may be a cobalt-modified MoS. The hydrodesulfurization catalyst may have an alumina base impregnated with cobalt and molybdenum (typically called a CoMo catalyst).

The hydrodesulfurization reaction occurs in presence of the catalyst in the fixed-bed reactor at a temperatures for example, in the range of 300° C. to 400° C. and a pressure, for example, in the range of 30 bar to 130 bar. As mentioned, the hydrodesulfurization reaction in the fixed-bed reactor may be a hydrogenation reaction, i.e., giving addition of hydrogen (H). In particular, the type of hydrogenation reaction is hydrogenolysis that cleaves the C—S bond and forms C—H and H—S bonds. The hydrodesulfurization (hydrogenation) reaction with the example of propanethiol (C3H7SH) as a sulfur impurity in the hydrocarbon feed is as follows: C3H7SH+H2→C3H8+H2S.

The fixed-bed reactor may additionally include a bed (e.g., packed bed) of absorbent (e.g., zinc oxide or ZnO) to remove (absorb) the H2S from the hydrocarbon (e.g., naphtha). The H2S removed from the hydrocarbon via capture of the H2S into the absorbent may include the H2S formed in the hydrodesulfurization conversion of sulfur compounds and also the H2S that entered the fixed-bed reactor in the hydrocarbon feed. The fixed bed reactor may discharge the hydrocarbon 206, for example, having less than less than 1 ppm sulfur. In some implementations, the absorbent is not in the fixed-bed reactor but instead in a second vessel that receives the hydrocarbon having the H2S from the fixed-bed reactor. Thus, in those implementations, the second vessel discharges the hydrocarbon 206 having, for example, less than 1 ppm sulfur. In either configuration, the ZnO bed that captures the H2S may be replaced with a fresh ZnO bed including over the maintenance cycle.

In other embodiments, the fixed-bed reactor may discharge the hydrocarbon (e.g., naphtha) having the formed hydrogen sulfide through a cooler (heat exchanger) and gas separator to a distillation column. The distillation column may be, for example, a reboiled stripper distillation tower. The stripper distillation tower may remove sour gas (e.g., primarily H2S) overhead. The overhead sour gas from the stripper distillation tower may contain hydrogen, methane, ethane, hydrogen sulfide, propane, etc. The bottoms from the stripper distillation tower may be the final desulfurized liquid product from the hydrodesulfurization unit and can be the hydrocarbon feed 206 to the pre-reformer 204.

As discussed, the hydrocarbon feed 206 may react with steam over a catalyst bed in the pre-reformer 204. The pre-reformer 204 converts higher hydrocarbons to methane-rich reformed gas which is fed to the membrane reformer 202. In the membrane reformer 202, hydrocarbons react with steam over steam-reforming catalyst. Again, the pre-reformer 204 and the membrane reformer 202 operation can be combined in a single unit 210. See, e.g., FIG. 3.

The membrane reformer system 200 may include unit operations downstream of the membrane reformer 202 to process permeate (hydrogen) and process retentate (carbon dioxide). The reformer system 200 may include a hydrogen purification system 214 (for dehydration and polishing system) that receives permeate 216 (e.g., at least 95 mol % hydrogen) discharged from the bore (permeate side) of the tubular membrane in the membrane reformer 202. The hydrogen purification system 214 may, for example, first remove water to dehydrate the hydrogen. For instance, the system 214 may route (flow) the permeate 216 through a cooler (heat exchanger) and then through a condenser (second heat exchanger) that removes heat to condense water vapor (steam) and discharge the condensed water. In particular implementations, the condenser may be a vessel having a cooling condensing element that removes heat to condense water in the hydrogen. The water may discharge from a bottom portion of the condenser vessel. The dry hydrogen may discharge overhead from the condenser vessel. The cooling condensing elements may be, for example, tubes or a coil that receive a cooling medium, such as cooling tower water or refrigerated water.

In the hydrogen purification system 214, the dehydrated hydrogen may be subjected to polishing to further purify the hydrogen, such as by removing residual CO2 and other components. Polishing may be a unit operation that removes substantially the last traces or concentrations of an impurity. To perform the polishing, the dehydrated hydrogen may be sent through a vessel having adsorbent (e.g., a porous ceramic) to remove residual carbon dioxide from the dehydrated hydrogen. The CO2 may be selectively removed from the hydrogen by adsorption onto an adsorbent. The output of the polishing may be a dry hydrogen 218 product that is at least 99.999 mol % hydrogen. Polishing could be through adsorption that captures the carbon impurities and can additionally include catalytic conversion to convert certain carbon species for capture. In some embodiments, certain polishing steps can be combination of polishing and compression via an electrochemical compressor, which may facilitate to purify hydrogen while compressing the hydrogen to targeted pressures for distribution. The electrochemical compressor may block non-hydrogen species that are then recycled back to upstream in the process or for heat recovery. In some instances when an electrochemical compressor is employed, the hydrogen purification system 214 does not include or utilize adsorbent or a vessel having adsorbent for treating (purifying) the hydrogen.

The hydrogen 218 (e.g., at less than 5 bar) may be sent through a compression system 220 having a compressor, such as mechanical compressor, an electrochemical compressor, reciprocating piston compressor, piston-diaphragm compressor, an ionic compressor, or a metal hydride compressor, or any combinations thereof. The compressor may be a multi-stage compressor. As indicated, employment of an electrochemical compressor may provide for hydrogen polishing and compression at the same time. The compressor may increase the pressure of the hydrogen (for distribution) to at least 400 bar, at least 500 bar, or at least 850 bar. The compressed hydrogen product 222 may discharge from the compression system 220 into a pipeline, cylinders, tube trailer, etc. for distribution. The compressed hydrogen 222 may generally be gas or supercritical fluid.

The membrane reformer system 200 may include a CO2 purification system 224 that includes a condenser heat exchanger to remove water from the retentate 226 (typically a gas) and a cryogenic separation vessel (e.g., distillation column) to subsequently discharge CO2 as a liquid bottoms stream that is CO2 product 228 (e.g., at least 99 mol % CO2). The remaining components (e.g., relatively small amounts of hydrogen, CO, CH4, CO2, etc.) as retentate off-gas 230 may discharge overhead from the cryogenic separation vessel. In certain embodiments, these remaining components (retentate off-gas 230) may be subject to combustion in an afterburner with air.

Thus, the CO2 purification system 224 receives retentate 226 (primarily carbon dioxide) from the retentate side (reaction space) in the membrane reformer 202 vessel. The retentate 226 may be, for example, at least 90 mol % CO2.

As mentioned, in the CO2 purification system 224, this high-pressure retentate stream 226 may be partially-condensed to condense and remove (knock-out) water, and fed to a CO2 liquefaction system. The CO2 liquefaction process may be a cryogenic type operating at temperatures, for example, between −55° C. and −20° C. Liquid CO2 product 228 may exit the CO2 liquefaction system for storage, transport, and/or further processing. As described, the remaining off-gases (retentate off-gas 230) may typically include CH4, H2, CO, and CO2. The off-gases 230 exit and are combusted or instead recycled to upstream of the membrane reformer 202 including upstream of the pre-reformer 204. This retentate off-gas stream 230 (the retentate stream after removal of CO2 product) may be combusted with the addition of air, and the energy recovered through heat integration in the membrane reformer system 200. Alternatively, this stream 230 can be recycled (instead of combusted) back to the inlet of the pre-reformer 204 or membrane reformer 202. This process configuration facilitates to avoid secondary CO2 sources other than the process, and CO2 capture can approach 100%.

The CO2 purification system 224 can include at the front end a heat exchanger pre-cooler (or condenser) to reduce temperature of the incoming retentate 226 (and condense components such as water), a separator vessel to remove liquid (e.g., water) from the retentate 226, and a mechanical compressor (if needed) to increase pressure of the retentate 226. In some implementations, the system 224 can include a scrubber vessel (e.g., having mass-transfer packing) to wash and cool the retentate 226 (primarily CO2). Water-soluble components (e.g., alcohols), if present, may be removed via the scrubber. The scrubber system may include a pump to recirculate a scrubbing liquid discharged from a bottom portion of the scrubber vessel through an external cooler heat-exchanger into an upper portion of the scrubber vessel. The scrubbing fluid may flow downward through the packing. The retentate as treated may discharge from an upper portion of the scrubber vessel. The retentate may be sent through a dryer, adsorber, or filters to remover further components, such as carbonyl sulfide (if present). The retentate may be sent to a cryogenic distillation column (vessel) for further purification and to liquefy the carbon dioxide. The cryogenic distillation column system may include a reboiler heat exchanger, and an overhead heat exchanger receiving refrigerant (e.g., from a refrigeration unit) as a heat transfer (cooling) medium. A liquid bottoms stream may discharge from the cryogenic distillation column as the liquid carbon-dioxide product 228 that is at least 99.9 mol % carbon dioxide (or at least 99.99 mol % carbon dioxide). The liquid carbon dioxide 228 may be sent to storage or to another system as feedstock, and so on. The removed gas (retentate off-gas 230 including, for example, CH4, H2, CO, CO2, inert components, etc.) discharging overhead from the cryogenic distillation column may be recycled to the hydrocarbon feed 206. The removed gas (retentate off-gas 230) can instead be combusted (with air) and the energy produced by the combustion utilized, for example, to generate steam (e.g., for feed to the pre-reformer 204, feed as a sweep gas for the membrane reformer 202, etc.).

Lastly, the membrane reformer system 200 may include a control system 232 that facilitates or directs operation of the reformer system 200, such as the supply or discharge of flow streams (including flow rate) and associated control valves, control of heaters and heat exchanger, control of the operating temperatures and operating pressures, and so on. The control system 232 may include a processor and memory storing code (e.g., logic, instructions, etc.) executed by the processor to perform calculations and direct operations of the membrane reformer system 200. The processor (hardware processor) may be one or more processors and each processor may have one or more cores. The processor(s) may include a microprocessor, central processing unit (CPU), graphic processing unit (GPU), controller card, circuit board, or other circuitry. The memory may include volatile memory (for example, cache or random access memory), nonvolatile memory (for example, hard drive, solid-state drive, or read-only memory), and firmware. The control system 232 may include a desktop computer, laptop computer, computer server, programmable logic controller (PLC), distributed computing system (DSC), controllers, actuators, or control cards. The control system 232 may be communicatively coupled to a remote computing system that performs calculations and provides direction. The control system 232 may receive user input or remote-computer input that specifies the set points of control devices or other control components in the reformer system 200. In some implementations, the control system 232 may calculate or otherwise determine set points of the control devices.

Figure 3:
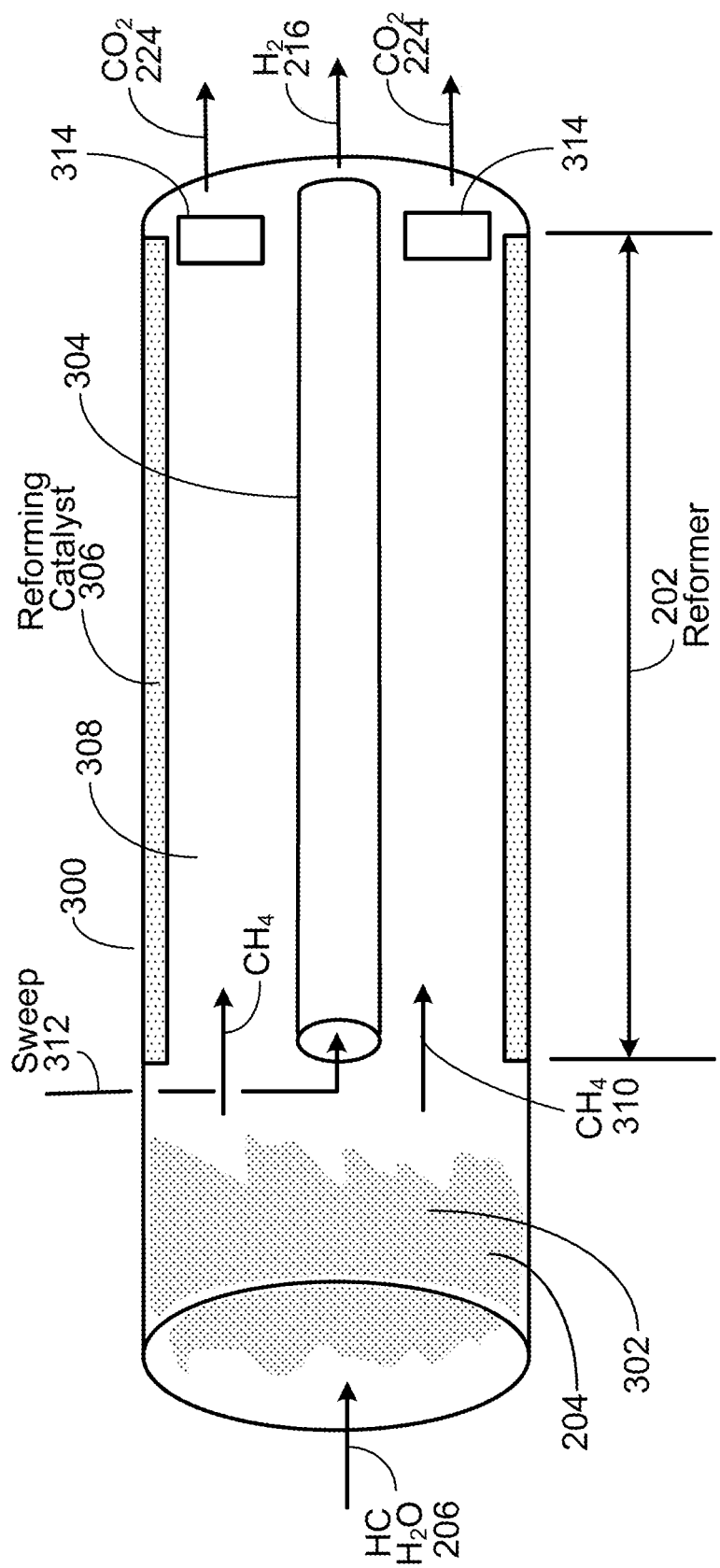
FIG. 3 is a side perspective-view of an embodiment of the integrated pre-reformer/membrane reformer of FIG. 2.

FIG. 3 is an embodiment of the integrated pre-reformer/membrane reformer 210 of FIG. 2. The integrated unit 210 includes a cylindrical vessel 300 (e.g., stainless steel) having a pre-reformer 204 in the vessel 300 of the membrane reformer 202. The pre-reformer 204 includes a packed catalyst bed 302. The catalyst in the packed catalyst bed 302 may be a pre-reforming catalyst that is nickel or a nickel-based catalyst. The pre-reformer 204 (and its packed catalyst bed 302) are disposed at an inlet portion of the vessel 300. The membrane reformer 202 has a tubular membrane 304 and a reforming catalyst 306. The integrated unit 210 is depicted as a simplified perspective view with the reforming catalyst 306 shown as a cross-section. The internals of the integrated unit 210 in the vessel 300 are shown for clarity without view obstruction by the vessel 300 wall. The tubular membrane 304 may share a longitudinal axis with the vessel 300. In the illustrated embodiment, the tubular membrane 304 is situated concentrically in the cylindrical vessel 300 and shares a central axis with the vessel 300.

The tubular membrane 304 of the membrane reformer 202 has a bore or lumen. The bore is the permeate side of the tubular membrane 304. The membrane material may be, for example, palladium (Pd) or Pd alloy. In certain embodiments, the membrane material (wall) of the tubular membrane 304 may be relatively thin, such as less than 10 μm. In one implementation, the thickness of the membrane is in the range of 2 μm to 4 μm. Furthermore, Pd and the membrane supports can be recycled. The reforming catalyst 306 (in the membrane reformer 202) may be a nickel catalyst or a nickel-based catalyst or other steam reforming catalysts based on noble or transition metals. In the illustrated embodiment, the reforming catalyst 306 is disposed at or adjacent the inside surface of the vessel 306. In some implementations, the reforming catalyst 306 is not in contact with the tubular membrane 304. The membrane reformer 202 has an internal region 308 that is a reforming reaction space. The region 308 is the volume space between the vessel 300 wall and the tubular membrane 304. The region 308 is the retentate side of the tubular membrane 304.

In operation, hydrocarbon 206 (e.g., naphtha) and steam are fed via a conduit(s) to the integrated pre-reformer/membrane reformer 210, such as to an inlet(s) (e.g., nozzle or nozzles) on the vessel 300. The hydrocarbon 206 is steam reformed in the packed bed of catalyst 302 (via the catalyst 302) to convert the hydrocarbon 206 to a methane-rich gas mixture. The methane-rich gas 310 flows from the pre-reformer 204 to the membrane reformer 202. In particular, the methane-rich stream 310 flows from the packed bed of catalyst 302 into the region 308 (reaction space) of the membrane reformer 202. In implementations, steam also flows from the pre-reformer 204 to the membrane reformer 202 or the reaction space 308.

The methane-rich stream 310 is steam reformed in the region 308 (reaction space) via the reforming catalyst 306 into hydrogen and carbon dioxide. As the hydrogen is formed, the hydrogen diffuses through the tubular membrane 304 into the bore 304 of the tubular membrane 304. The region 308 is generally at a greater pressure than the bore of the tubular membrane 304. The permeated (separated) hydrogen may discharge from the bore as permeate 216 (e.g., 90 mol % hydrogen) to a downstream system. The downstream system may be, for example, a dehydrator, a polisher, or a mechanical compressor. Retentate 224 (rich in carbon dioxide) having the carbon dioxide generated from the reforming reaction may discharge from the vessel 300 from the region 308 (retentate side) to a downstream system. The retentate 224 may be, for example, at least 90 mol % CO2. The downstream system may be a CO2 purification system, as discussed with respect to FIG. 2.

In certain implementations, a sweep gas 312 (e.g., steam) is provided to the bore of the tubular membrane 301 to facilitate displacement of the permeate 216 from the bore. The sweep gas 312 is depicted as flowing concurrently (same direction) as the methane 310 feed into the reaction space 308. In other implementations, the sweep gas 312 may enter the bore from the right side and thus flow countercurrent with respect to the methane-rich stream 310 entering the reaction space 308. In those implementations, the permeate 216 (with the sweep gas 312) may exit the left side of the bore from the tubular membrane 304 and discharge through a conduit to the downstream system.

In particular implementations, an inner tube may disposed concentrically in the bore. In those implementations, the left side of the tubular membrane 304 is capped. The sweep gas 312 enters from the right into the annulus between the inner tube and the membrane 304 wall, thus displacing permeate (hydrogen) in the annulus in a direction countercurrent with respect to the flow of methane-rich stream 310 into the region 308. The sweep gas 312 with displaced permeate (hydrogen) enters the inner tube at the capped end of the membrane 304 and flows from left to right to discharge as the permeate 216 on the right side.

A dry reforming catalyst 314 can be disposed in the unit 210 in the region 308 at an exit portion of the membrane reformer 202 to resist carbon formation and coking with the CO2 gas. The dry reforming catalyst 314 may be a catalyst that provides for resistance to coking and sintering. The dry reforming catalyst 314 (example Ni-MO on MgO support) may be a noble metal or a nickel alloy. The dry reforming catalyst 314 may be Ni-MO on MgO support.

The reforming catalyst (steam reforming), the dry reforming catalyst, and the pre-forming catalyst can be nickel or nickel-based. Pre-reforming catalyst or steam reforming catalyst may contain nickel but can be a noble-metal based catalyst, pladium (Pt) or ruthenium (Ru), including at relatively low reaction temperatures. Dry reforming catalyst may contain nickel but is typically a different formulation (e.g. a nickel alloy or a different metal oxide support) to suppress the accumulation of solid carbon (coke) on the catalyst that would deactivate the catalyst.

The vessel 300 may have heads (not shown). The vessel 300 may have a head at the inlet side of the vessel and a head at the discharge side of the vessel. The heads may be, for example, a flat plate. The plate can be welded to the vessel 300 wall, or the plate can be bolted (along with an intervening gasket) to the vessel 300 wall. In other embodiments, the heads are elliptical heads welded to the vessel 300 wall.

The integrated pre-reformer/membrane reformer 210 may have electrical resistive heaters (e.g., electrical cartridge heaters) disposed in the vessel 300 as internal heaters to provide heat for the reforming reaction. The integrated pre-reformer/membrane reformer 210 may have electrical resistive heaters (e.g., electrical band heaters) disposed on the outside surface of vessel 300 as external heaters to provide heat for the reforming reaction. The vessel 300 may have thermal insulation disposed on the outside surface of the vessel 300. The thermal insulation may reduce heat transfer to the environment and thus conserve heat. The thermal insulation may also provide for personnel protection.

The membrane reformer system 200 (FIG. 2) may be more efficient with respect to operational and capital costs compared to conventional steam methane reforming. A highly-selective palladium-based membrane as the tubular membrane in the membrane reformer 202 may facilitate production of high-purity H2 (e.g., 90 mol % to >99.9 mol %) reducing downstream processing prior to utilization of the hydrogen in pure-hydrogen applications.

The membrane reformer system 200 may provide for high-purity CO2. The retentate 224 may be subjected to low-temperature CO2 separation that can generate liquid CO2 including micron-sized, high-purity CO2 droplets. By mechanical separation and purging the retentate off-gas 230 (off-gases primarily non-condensable gases with a low CO2 amount), high-pressure high-purity CO2 (>99 mol %) can be directly suitable for storage. The membrane reformer system 200 may provide for high CO2 recovery in that the membrane reformer can facilitate economic capture >90+ mol % of the CO2 generated in the H2 production, unlike state-of-the-art solvent-based processes. These solvent-based processes are typically limited to a capture rate of about 65 mol % of CO2, including the CO2 produced in the steam reforming process. Conventional technologies can generally only reach higher overall capture rates at additional costs.

The membrane reformer system 200 may provide for recovery of CO2 as a liquid. In contrast, for an absorption process, the majority of CO2 is recovered as a gas at around atmospheric pressures. In the membrane reformer system 200, the captured CO2 may be at liquid state and can be further pressurized for transport by pumping at relatively lower energy cost without compression. The saved compression energy may increase the overall system efficiency.

Certain implementations of the membrane reformer system 200 may also provide for compactness. The system 200 can reduce the separation demand on the membrane process via removal of the hydrogen as the hydrogen is generated in the reforming reaction, which may lead to reduced Pd membrane area and thus increase the cost-competitiveness. Operation of the membrane reformer system 200 generally involves less steam use than conventional SMR. In conventional SMR, the greater amount of steam is implemented to drive the equilibrium to the product side. Conversely, for a membrane-assisted process, the addition of excess steam can be reduced, as the removal of H2 from the membrane reformer (reactor) moves the reaction to the product side.

The membrane reformer system 200 generally involves system or process intensification. In conventional H2 production, the purification step is performed by an amine scrubbing or PSA section. These purification technologies make problematic to reach separation demands for both H2 and CO2 at the same time. Conversely, the membrane reformer that integrates reforming and separation of both H2 and CO2 leads a higher conversion compared to the conventional SMR separation process, resulting in low CO- levels in the highly carbon enriched stream.

As discussed for operation of the present methane reformer 100 or 202, CO may be formed as an intermediate in steam methane reforming; $CH_4+H_2O \rightarrow CO+3H_2$ and $CO+H_2O \leftrightarrow CO_2+H_2$. For both of these equilibrium limited reactions, removal of the produced hydrogen shifts the conversion towards more products. There will typically be some residual CH4 and CO in the retentate stream due to incomplete conversion, but if the residence time is long enough, the concentrations of CH4 and CO in the retentate can approach zero. The overall reaction $CH_4+2H_2=CO_2+4H_2$ happens with more than stoichiometric steam presences as well as with H2 removal. There is formation of CO but can be reduced and if desired a water-gas shift catalyst can be added to or with the reforming catalyst to further shift CO to CO2 and H2.

The membrane reformer system may include an electrically-heated membrane reformer. The energy for reforming in the membrane reformer may be provided through an electrically-heated system (e.g., electrical resistive heaters) allowing to provide energy selectively to the catalytic zone allowing to achieve high thermal integration while also getting rid of the secondary CO2 emission source associated with combusting fuel in a furnace to provide heat for reforming. In conventional processes either liquid hydrocarbon or natural gas or PSA off gases are burned to provide the energy needed by the reformer. To achieve higher thermal efficiencies, steam generation is integrated to recover the additional energy and also this flue gas is second source of CO2. Renewable energy integration is possible using the electrically heated reformers.

EXAMPLES

Two Examples associated with a membrane reformer system (hydrogen production system) are presented: Example 1 (FIGS. 4-10) and Example 2 (FIGS. 11-14). The schematic flow diagrams (FIGS. 4 and 11) may resemble the membrane reformer system 200 (FIG. 2). At the outset, it should be noted that the retentate off-gas stream (the retentate stream after removal of product CO2) is combusted with the addition of air, and the energy recovered through heat integration in the membrane reformer system to generate steam. This steam generated is fed to the pre-reformer and as the sweep gas in Example 1. This generated steam is fed to the pre-reformer but not as sweep gas in Example 2. In alternate implementations, the retentate off-gas can be recycled (instead of combusted) back to the inlet of the pre-reformer or membrane reformer. This process configuration facilitates to avoid secondary CO2 sources other than the reforming reaction itself, and CO2 capture can approach 100%.

The hydrocarbon feed for the membrane reformer system may be, for example, at a pressure in a range of 2 bar to 50 bar, or 20 to 40 bar, and fed to a sulfur removal unit to remove any sulfur compounds that can be poisonous to the catalysts in the pre-reformer or membrane reformer. Hydrogen is fed to the sulfur removal unit to hydrogenate the sulfur compounds to remove the sulfur from the hydrocarbon feed. Typically, the sulfur removal unit may operate, for example, at a temperature between 250° C. and 450° C. and pressure between 10 bar and 50 bar, more specifically at a pressure between 20 bar and 40 bar.

The sulfur-free hydrocarbon feed (e.g., less than 1 ppm sulfur) leaves the sulfur removal unit and is fed to the pre-reformer. The pre-reformer objective may be to crack the long chain of hydrocarbons into shorter chains, producing especially a methane rich gas. The pre-reformer is typically fed with steam and cracks the long hydrocarbon molecule into methane in the presence of a catalyst. Pre-reformers are available in the industry and different catalysts developed to pre-reform different types of hydrocarbon feeds. The pre-reformer may typically operate between 300° C. and 650° C. or between 400° C. and 600° C., and between 1 bar and 50 bar or between 20 bar and 40 bar. The methane-rich generated in the pre-reformer is further reformed in the membrane reformer (membrane reforming unit) having reforming catalyst to reform the methane into hydrogen and CO2. A hydrogen selective membrane is integrated with the catalyst in the membrane reformer to separate the hydrogen contemporaneous with the hydrogen being generated via the reforming reaction. Additionally, a dry reforming catalyst can be packed around the hydrogen selective membranes towards the exit of the reactor. Towards the exit of the membrane reactor on the higher pressure side, a carbon rich environment is generated with the hydrocarbon being converted to hydrogen and CO2 and most of the hydrogen being extracted by the hydrogen selective membrane. The resulting CO2, CO rich composition on the retentate side of the tubular membrane might initiate carbon formation/coking on the reforming catalyst or hydrogen selective membrane. A coking and sintering resistant dry-reforming catalyst can be packed (coating or structured form) towards the end of the reactor bed to provide for restricting coke formation in operation.

The membrane reformer (membrane reforming unit) contains a high-temperature hydrogen-separation membrane (e.g., a palladium alloy membrane) that selectively allows hydrogen to pass from the high pressure side to permeate low pressure side. The membrane reformer is operated between 300° C. and 700° C., more specifically between 400° C. and 600° C., and at pressure between 8 bar and 50 bar, more specifically between 10 bar and 40 bar. For certain operation (and that can be beneficial or optimized operation), the membrane reformer may be operated at the same or similar conditions (temperature, pressure) of the pre-reformer.

As the hydrocarbon reforming is endothermic, the membrane reformer is supplied with external energy to maintain operating temperature at a desired level. The external energy can be provided through electrical heating, a nearby heat source via a secondary heat loop, or through direct heating using a furnace. In order to promote the hydrogen transport across the tubular membrane, the permeate side may be maintained at lower pressure (than the retentate side external to the tubular membrane) and a lower partial pressure of hydrogen on the permeate side may be maintained utilizing a sweep gas. Typical permeate pressure can be between 0.5 bar and 10 bar, more specifically between 1 bar and 3 bar.

The remaining hydrogen, as well as the generated CO2, unconverted CH4, any CO, and un-consumed water vapor, exit the membrane reformer as retentate at the pressure and temperature of the membrane reformer operation: typically between 300° C. and 700° C., more specifically between 400° C. and 600° C., and at pressure between 1 bar and 50 bar, more specifically between 20 and 40 bar. This high-pressure retentate stream may be partially-condensed to condense water and fed to a typical CO2 liquefaction process where the condensed water and any additional remaining water are knocked out of the system. The CO2 liquefaction process may be typically of cryogenic type operating at temperatures, for example, between −55° C. and −20° C. Water is removed from the system to avoid freezing of the water and associated blocking of the pipes (piping). Liquid CO2 may exit CO2 liquefaction system for storage, transport, and/or further processing. The remaining off-gases may typically include CH4, H2, CO, and CO2 that exit and are combusted or instead recycled in the process upstream of the membrane reformer.

Lastly, the pre-reformer and membrane reformer can be integrated in a single unit operation/reactor vessel where the inlet part of the membrane reformer has (1) a first part of the reactor that is packed-bed catalyst configuration with pre-reforming catalyst and (2) a second part of the reactor having hydrogen selective membrane(s) along with steam reforming catalyst packed around the membrane in structural form (coated on reactor walls or mesh coated with catalyst wrapped around the membrane). Dry reforming catalyst can be included toward the discharge of the reactor to reduce coking in operation, as discussed.

Example 1

Figure 4:
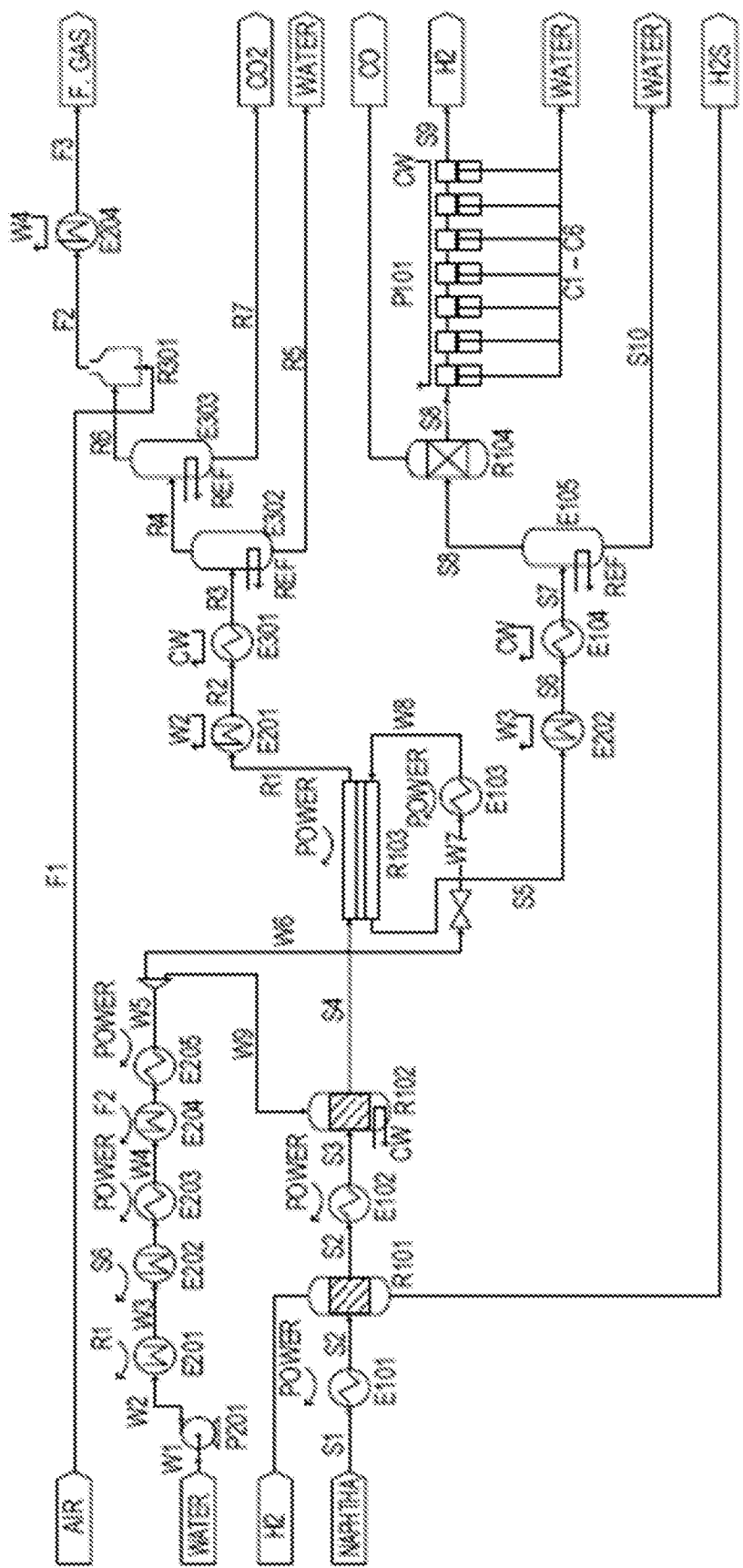
FIG. 4 is a schematic flow diagram for an ASPEN® model simulation of a membrane reformer system in Example 1.

FIG. 4 is a schematic flow diagram for a model simulation via Aspen Plus® software (version 10.0) of a membrane reformer system (hydrogen production system) in Example 1. FIG. 5 is a legend associated with FIG. 4. FIGS. 6-10 are mass balance data and stream information generated with the Aspen model for the schematic flow diagram of FIG. 4.

The left side of FIG. 4 depicts introduction of the following streams into the membrane reformer system: (1) air F1 for combustion of the retentate off-gas stream R6 in the afterburner R301; (2) water W1 for generation of steam W5 with a first portion W6 of the steam used as sweep gas and a second portion W9 of the steam fed to the pre-reformer R102; (3) H2 (for hydrogenation) to the hydrodesulfurization unit R101; and (4) naphtha S1 (heated naphtha S2) as the hydrocarbon feed to be treated for sulfur removal in the hydrodesulfurization unit R101.

The desulfurized naphtha (S2, S3) flows to the pre-reformer R102 that converts the naphtha to methane. The methane (and steam) flows in S4 to the membrane reformer R103 that converts the methane to carbon dioxide (discharged in retentate R1) and hydrogen (discharged in permeate S5). The sweep gas (steam W6) exits in the permeate S5. The retentate is processed in condenser E302 (to remove water R5) and in cryogenic distillation column E303 to remove off-gas R6 to give liquid CO2 product R7. As mentioned, the retentate off-gas R6 is combusted with the addition of air F1 in the afterburner R301.

Permeate is processed in permeate condenser vessel E105 (to remover water S10) and in CO separation vessel R104 to remove CO (and other impurities) to give purified hydrogen S8. In general, R104 is a multicomponent adsorption bed that can generally remove most or essentially all the impurities from the stream S8. The adsorbent could like activated carbon or zeolite materials. The hydrogen S8 is compressed in the multi-stage compressor P101 to increase the hydrogen pressure to give hydrogen product S9. Water C1-C6 may be removed from each stage. The water C1-C6 removal increases purity of the hydrogen. Generally, the S8 stream will be dried before passing it to the compressor unless the compressor is an electrochemical compressor which typically relies on saturated moisture levels for its operation.

The heat transfer fluid for some heat exchangers are a stream number indicating recovery of heat within the membrane reformer system. Where "power" is noted indicates an electrical heater or electrical heating. "CW" is cooling water, such as cooling tower water. The abbreviation "ref" is refrigerant or refrigerated fluid.

Example 2

Figure 11:
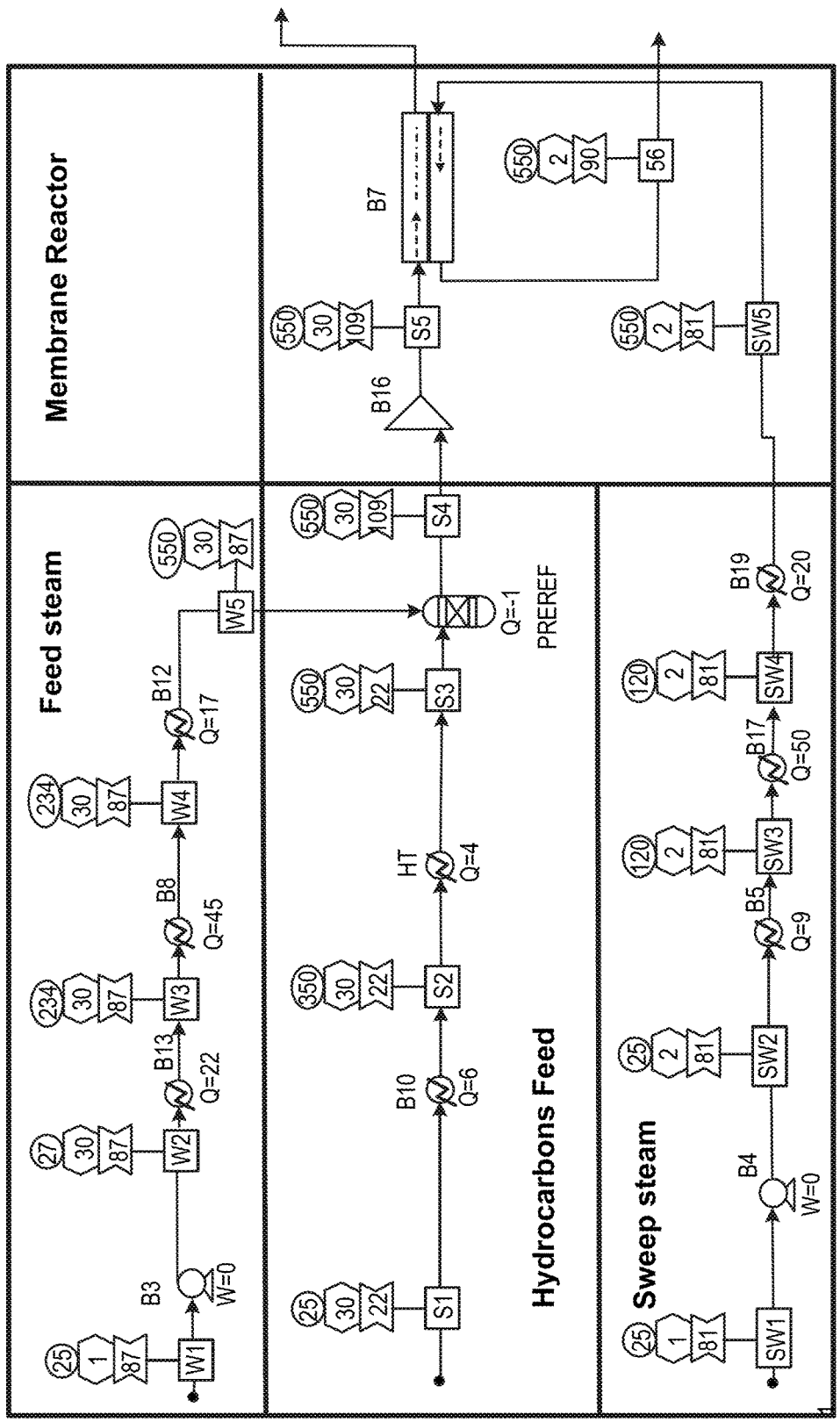
FIG. 11 is a schematic flow diagram for an ASPEN® model simulation of a membrane reformer system in Example 2.
Figure 11:
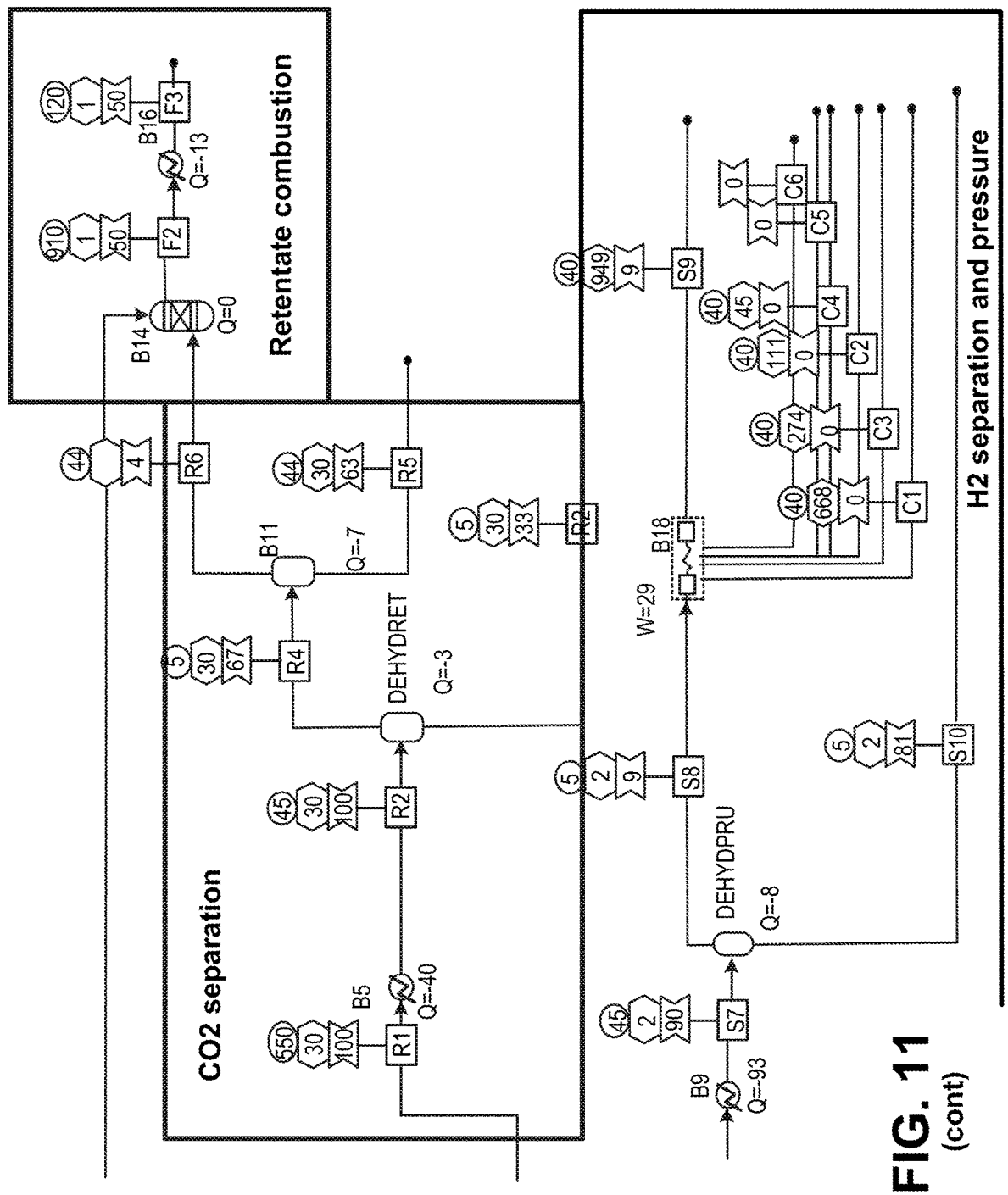

FIG. 11 is a schematic flow diagram for an Aspen Plus® (version 10.0) model simulation of a membrane reformer system (hydrogen production system) in Example 2. FIGS. 12-14 are tables of mass balance data and stream information generated with the ASPEN model for the schematic flow diagram of FIG. 11. The membrane reformer system in FIG. 11 resembles the membrane reformer systems (hydrogen production systems) of FIGS. 2 and 4. Sections of the membrane reformer system in FIG. 11 include a feed steam section, hydrocarbon feed section, sweep steam section, membrane reactor section, CO2 separation section, retentate combustion section, and H2 separation and pressurization section.

Benefits of a hydrogen production system as embodiments of the present membrane reformer system (e.g., FIGS. 1-4 and 11) may include process integration or intensification, energy efficiency, and CO2 capture. In embodiments, CO2 is generally captured at high pressure and may be suitable for direct liquefaction of the CO2 for disposal or utilization. Moreover, the low-temperature steam reforming may additionally employ a dry reforming catalyst with the hydrogen selective membrane. In certain embodiments, most or all energy/heat for the membrane reformer system is provided via electrical heaters. Renewable energy (e.g., solar or wind) may be utilized. In implementations, a very low CO2 footprint is associated with the produced hydrogen.

Figure 15:
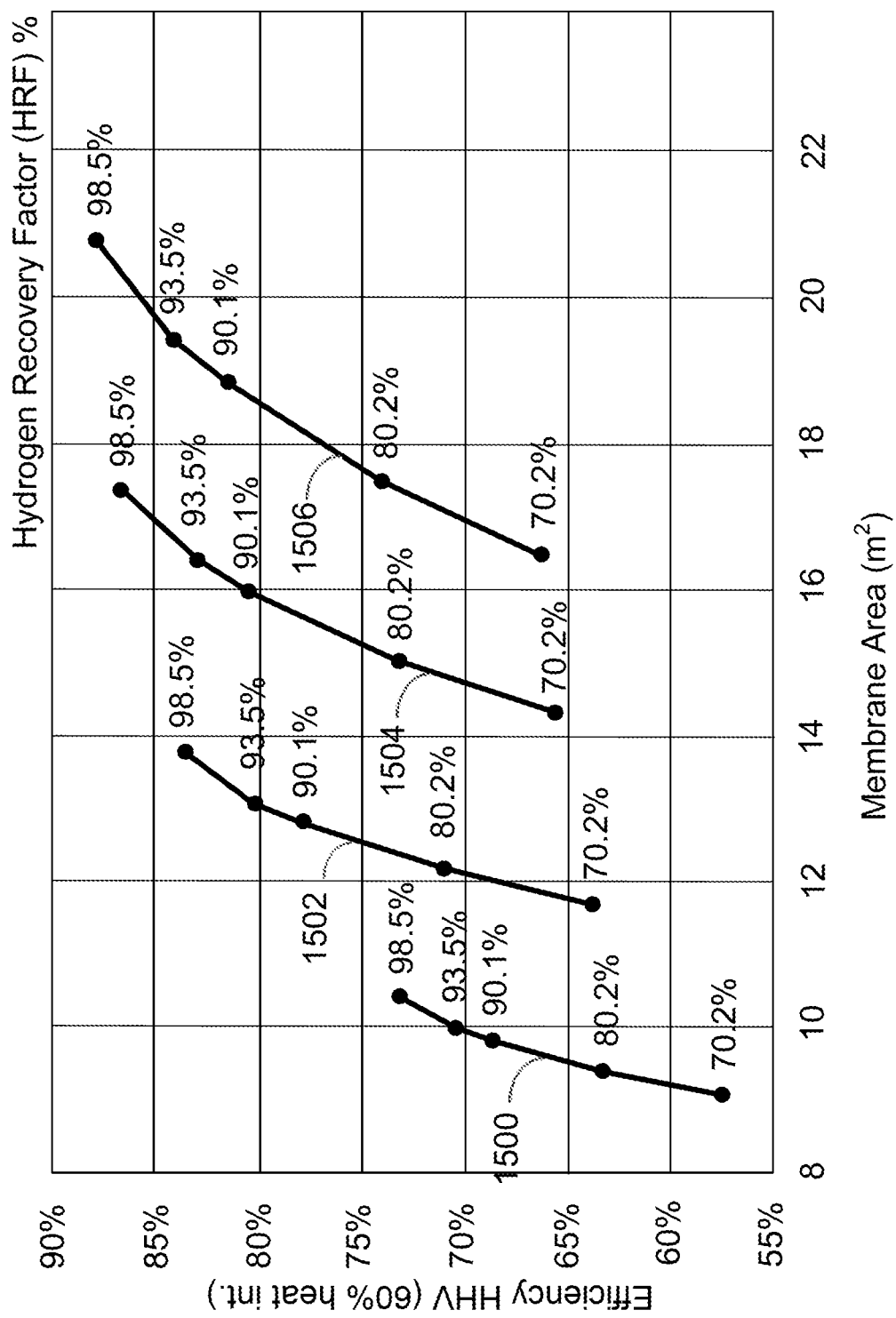
FIG. 15 is a plot of curves of hydrogen recovery factor (HRF) with respect to efficiency higher heating value (HHV), membrane area, and sweep ratio to H2.

FIG. 15 is a plot of curves of hydrogen recovery factor (HRF) in percent (%) with respect to efficiency higher heating value (HHV) (%), membrane area (m2), and sweep ratio to H2 for embodiments of the membrane reformer system. The data for FIG. 15 was determined (calculated) in a sensitivity analysis conducted utilizing different cases run on Aspen Plus® (version 10.0) model and then spreadsheet application to run the sensitivity. The "60% heat int." for Efficiency HHV on the y-axis means 60% heat integration. The heat integration is the amount of heat recovered from hot streams to heat cold streams.

The production basis in FIG. 15 is 100 Nm3/hr hydrogen produced with heavy naphtha as feed. Efficiency as a parameter is considered with respect to hydrogen recovery, hydrocarbon conversion, sweep gas ratios, and membrane area. Five points (70.2, 80.2, 90.1, 93.5, and 98.5) for HRF are depicted along each of the four curves 1500, 1502, 1504, and 1506. The HRF % is the amount of H2 that diffuses through the membrane divided by the total amount of H2 in the reformer. The first curve 1500 is for a sweep ratio to H2 equal to 3.00. The second curve 1502 is for a sweep ratio to H2 equal to 1.00. The third curve 1504 is for a sweep ratio to H2 equal to 0.52. The fourth curve 1506 is for a sweep ratio to H2 equal 0.33. The sweep ratio ("Sweep Ratio to H2") defined with respect to the product hydrogen flow on a molar flow basis. This sweep ratio is the molar ratio of the steam flow as sweep on permeate side to the total hydrogen flow at the outlet of the reformer. As can be seen in FIG. 15, efficiency is higher at lower sweep ratio because less steam sweep has to be generated. Higher efficiency is generally desired. A lower sweep ratio to gives a greater efficiency HHV at the same HRF.

As indicated in FIG. 15, Sweep gas can be a significant parameter in achieving hydrogen recovery and high-purity hydrogen. Sweep gas also may provide for reducing membrane surface area (lower capital expenditure) in achieving targeted process performance. Based on the operating process parameters, the membrane system may have a wider operating envelop and can be balanced for higher efficiency performance using lower sweep ratios but such lower sweep rations may be for larger membrane surface area. While higher sweep ratios (higher operating cost) provides some penalty to the process, such can provide for high hydrogen recoveries using lower membrane surface areas (lower capital costs).

Figure 16:
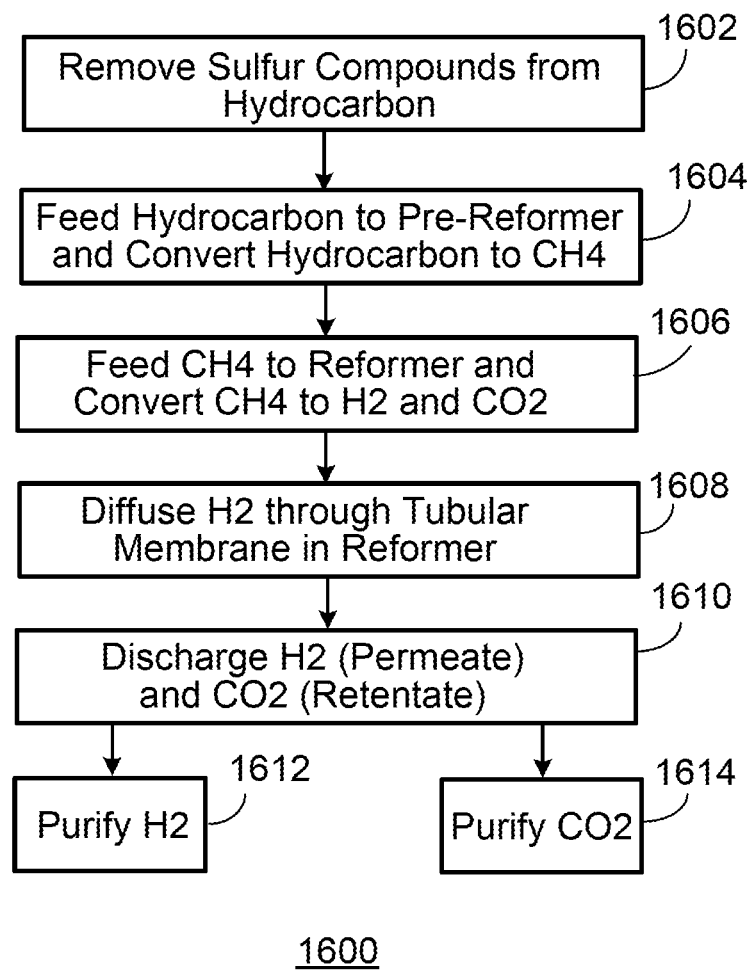
FIG. 16 is a block flow diagram of a method of producing hydrogen.

FIG. 16 is a method 1600 of producing hydrogen with a membrane reformer system that includes a pre-reformer and a membrane reformer. In implementations, the membrane reformer system has a hydrogen-production capacity less than 10000 Nm3/hr, such as in the range of 200 Nm3/hr to 10000 Nm3/hr or in the range of 20 Nm3/hr to 10000 Nm3/hr. Thus, the method 1600 may be a method of producing hydrogen at less than 10000 Nm3/hr, such as in the range of 200 Nm3/hr to 10000 Nm3/hr. In other implementations, the production capacity can be greater than 10000 Nm3/hr. The membrane reformer system may be modular in employing or involving respective modules for different sections or unit operations, or as the basis of design or construction.

The method 1600 is a method of producing hydrogen with the membrane reformer system that includes a pre-reformer and a membrane reformer. The membrane reformer may be a vessel (e.g., stainless-steel cylindrical pressure vessel) having reforming catalyst and a hydrogen-selective tubular membrane (e.g., Pd). The tubular membrane may share a longitudinal axis and/or central axis with the vessel. The tubular membrane may be disposed concentrically in the vessel. See, e.g., FIG. 1.

At block 1602, the method includes removing sulfur compounds from hydrocarbon. To do so, the method may include hydrogen treatment of the sulfur compounds in the hydrocarbon to convert the sulfur to H2S and then followed by absorption or adsorption of the H2S on an absorbent or ZnO material. In particular, the method may include feeding the hydrocarbon to a hydrodesulfurization unit having a fixed-bed reactor with a catalyst for the hydrogen treatment to remove the sulfur compounds from the hydrocarbon. The sulfur compounds may be converted, for example, to hydrogen sulfide (H2S) to facilitate their removal. An absorbent (e.g., ZnO) in the fixed-bed reactor or downstream vessel may be removed the formed H2S. The hydrodesulfurization unit may discharge the hydrocarbon (as treated) having less than 0.1 parts per million (ppm) of sulfur compounds or compounds having sulfur (S). Other configurations are applicable. For instance, in other embodiments, the hydrodesulfurization unit may include a distillation column to receive and process the hydrocarbon having the H2S from the fixed-bed reactor and discharge overhead the formed H2S. If a distillation column is employed, the hydrocarbon minus the removed sulfur compounds may discharge as a liquid bottom stream from the distillation column.

At block 1604, the method includes feeding hydrocarbon and steam via a conduit to the pre-reformer having pre-reforming catalyst, and converting the hydrocarbon to methane via the pre-reforming catalyst in the pre-reformer. The pre-reformer may include an inlet (e.g., a nozzle) coupled to the conduit to receive the hydrocarbon and steam. The hydrocarbon may be or include the treated hydrocarbon discharged from the hydrodesulfurization unit. The hydrocarbon may be, for example, naphtha, kerosene, gasoline, diesel, liquefied petroleum gas (LPG), or any combinations thereof.

In some implementations, the pre-reformer and downstream membrane reformer may integrated into a single unit. For example, the pre-reformer and the membrane reformer may share the same vessel. In the integrated unit, the pre-reformer may include the pre-reforming catalyst disposed in an inlet portion of the vessel. See, e.g., FIG. 3.

At block 1606, the method includes feeding the methane-rich stream from the pre-reformer to the membrane reformer, and converting the methane (and any hydrocarbon) to hydrogen and carbon dioxide by steam reforming via the reforming catalyst in the membrane reformer. The steam reforming occurs in a region in the membrane-reformer vessel external to the tubular membrane. The region may be a reaction space for the steam reforming. The region is generally a retentate side of the tubular membrane. The steam reforming may occur, for example, at less than 600° C. (or less than 650° C.) in the vessel. In some embodiments, the method may additionally include converting (reforming) the methane to hydrogen via dry reforming catalyst disposed in an exit portion of the membrane reformer. Both steam reforming and dry reforming may occur over the dry reforming catalyst because there will still be steam present in the gas mixture. A purpose of the dry reforming catalyst may be to restrict coking at low steam-to-carbon ratios. The dry reforming catalyst may act by forming H2 and CO. The CO is then converted into H2 and CO2 via WGS reaction.

The method may include providing heat to the membrane reformer (for the endothermic steam reforming) via an electrical heater disposed on or in the membrane-reformer vessel. The operating temperature of the membrane reformer may be less than 600° C. or less than 650° C.

At block 1608, the method includes diffusing the hydrogen (permeate) from the region (reaction space external to the tubular membrane) through the tubular membrane into a bore of the tubular membrane. The bore is a permeate side of the tubular membrane. The diffusing of the hydrogen through the tubular membrane can be generally contemporaneous with converting the methane to hydrogen in the reaction space. In certain embodiments, the method includes providing a sweep gas (e.g., steam or nitrogen) to the bore and displacing the hydrogen from the bore with the sweep gas. Such may increase driving force for hydrogen permeation through the tubular membrane from the region to the bore.

At block 1610, the method includes discharging a hydrogen stream from the bore (permeate side) and discharging a carbon-dioxide stream from the region (retentate side). The hydrogen stream (primarily hydrogen) may include at least 90 mol % hydrogen reported on a dry basis. The carbon-dioxide stream (primarily carbon dioxide) may include at least 90 mol % carbon dioxide. The membrane-reformer vessel may include an outlet (e.g., nozzle) to discharge the hydrogen stream. The membrane-reformer vessel may include another outlet (e.g., nozzle) to discharge the carbon-dioxide stream.

At block 1612, the method includes purifying the hydrogen stream. While the hydrogen stream is at relatively high-concentration (purity) hydrogen, the hydrogen stream may be further purified (water removal and polished) so to be distributed as pure hydrogen and for a wider range of applications. The method may include condensing water in the hydrogen stream, removing the water as condensed from the hydrogen stream, and then purifying the hydrogen stream to give hydrogen product that is at least 99.9 mol % hydrogen. The hydrogen may purified (or polished) with an adsorbent (e.g., an adsorbent bed in a vessel) to capture impurities in the hydrogen stream. The method may further include compressing the hydrogen product to increase pressure of the hydrogen product to at least 300 bar or at least 350 bar. Some of the compression technologies (e.g., electrochemical compressor) can perform polishing and compression together.

At block 1614, the method includes purifying (and liquefying) the carbon dioxide stream discharged from the region (retentate side) of the membrane-reformer vessel. Advantageously, this discharged carbon stream (retentate stream) may be at relatively high purity and relatively high pressure. To further purify the carbon stream, the method may include condensing water in the carbon dioxide stream, removing the water as condensed from the carbon dioxide stream, and cryogenically purifying the carbon dioxide stream to give liquid carbon-dioxide product comprising at least 99 mol % carbon dioxide.

An embodiment is a method of producing hydrogen. In implementations, the method may produce hydrogen in a range of 20 $Nm^3$/hr to 10,000 $Nm^3$/hr. The method includes feeding hydrocarbon and steam to a pre-reformer having a pre-reforming catalyst, and converting hydrocarbon to methane via the pre-reforming catalyst in the pre-reformer to give a pre-reformed intermediate that is a methane-rich mixture. The hydrocarbon fed to the pre-reformer may include, for example, naphtha, kerosene, gasoline, diesel, liquefied petroleum gas (LPG), or any combinations thereof. The method may include removing sulfur compounds from the hydrocarbon prior to feeding the hydrocarbon to the pre-reformer. In implementations, the hydrocarbon as fed to the pre-reformer comprises less than 0.1 ppm of sulfur compounds comprising sulfur (S). The method includes feeding the pre-reformed intermediate from the pre-reformer to a membrane reformer vessel having reforming catalyst and a tubular membrane, and converting methane in the pre-reformed intermediate to hydrogen and carbon dioxide by steam reforming (e.g., at less than 600° C.) via the reforming catalyst in the membrane reformer in a region in the vessel external to the tubular membrane. The method may include converting hydrocarbon, in addition to the methane, in the pre-reformed intermediate in the membrane reformer to hydrogen and carbon dioxide. The region external to the tubular membrane is a retentate side of the tubular membrane and may be a reaction space for the steam reforming. The method includes diffusing the hydrogen from the region through the tubular membrane (hydrogen selective) into a bore of the tubular membrane. The bore is a permeate side of the tubular membrane. The diffusing of the hydrogen through the tubular membrane may be contemporaneous with converting the methane to the hydrogen. The method may include providing a sweep gas to the bore, displacing the hydrogen from the bore with the sweep gas, increasing driving force for hydrogen permeation through the tubular membrane to the bore from the region via displacing the hydrogen from the bore with the sweep gas, and discharging a hydrogen stream from the bore. The method may include condensing steam in the hydrogen stream and removing the steam as condensed from the hydrogen stream, wherein the sweep gas is steam in this instance, and wherein the hydrogen stream as discharged from the bore is at least 90 mol % hydrogen on a dry-basis. The method may include purifying the hydrogen stream to give hydrogen product that is at least 99.9 mol % hydrogen, and compressing the hydrogen product to a pressure of at least 300 bar or at least 350 bar. The purifying may include routing the hydrogen stream through a vessel having adsorbent and removing components from the hydrogen stream via the adsorbent. In some implementations, the purifying and the compressing are performed via an electrochemical compressor. The method may include (1) discharging a carbon-dioxide stream from the region external to the tubular membrane and with the carbon-dioxide stream at least 90 mol % carbon-dioxide, (2) condensing water in the carbon dioxide stream, (3) removing the water as condensed from the carbon dioxide stream, and (4) cryogenically purifying the carbon dioxide stream to give liquid carbon-dioxide product comprising at least 99 mol % carbon dioxide. The operating temperature of the membrane reformer may be less than 650° C. The method may include providing heat to the membrane reformer via an electrical heater. In certain implementations, the pre-reformer includes pre-reforming catalyst in an inlet portion of the vessel of the membrane reformer. Thus, in those implementations, the pre-reformer and the membrane reformer may be an integrated unit. Lastly, the method may include converting the methane to hydrogen via dry reforming catalyst disposed in an exit portion of the membrane reformer.

Another embodiment is a system for hydrogen production. In certain implementations, the system has a hydrogen production capacity in a range of 20 $Nm^3$/hr to 10,000 $Nm^3$/hr. The system has a pre-reformer to receive hydrocarbon and convert the hydrocarbon to methane via a pre-reforming catalyst. The hydrocarbon may be, for example, naphtha, kerosene, gasoline, diesel, liquefied petroleum gas (LPG), or any combinations thereof. The system may include a conduit to provide steam to the pre-reformer. The system has a membrane reformer to receive the methane from the pre-reformer. The membrane reformer may receive the methane in a methane-rich mixture from the pre-reformer. The membrane reformer includes (1) a vessel, (2) a reforming catalyst in the vessel to convert the methane by steam reforming into hydrogen and carbon dioxide, (3) a tubular membrane (hydrogen selective) in the vessel to diffuse the hydrogen through the tubular membrane (e.g., including palladium) to a bore of the tubular membrane, and (4) a region in the vessel external to the tubular membrane for the steam reforming. The region is a retentate side of the tubular membrane. The reforming catalyst is disposed external to the tubular membrane. In implementations, the reforming catalyst is not in contact with the tubular membrane. The bore is a permeate side of the tubular membrane. The system may include a conduit to provide nitrogen or steam as sweep gas to the bore. In implementations, an inner tube is disposed concentrically in the bore to facilitate flow of a sweep gas in the bore to displace hydrogen from the bore. The system may include an electrical heater to provide heat to the membrane reformer for the steam reforming. The membrane reformer vessel may be a cylindrical vessel. In implementations, the tubular membrane shares a longitudinal axis with the vessel. In particular implementations, the tubular membrane is disposed concentrically in the vessel. In some implementations, the membrane reformer includes a dry reforming catalyst in an outlet portion of the vessel. In certain implementations, the pre-reformer includes the pre-reforming catalyst in an inlet portion of the membrane reformer vessel, and thus the pre-reformer and membrane reformer may be integrated.

The system for producing hydrogen may include a hydrogen purification system to process permeate from the bore to give hydrogen product that is at least 99.9 mol % hydrogen, the hydrogen purification system including a condenser heat exchanger, a vessel having adsorbent, or an electrochemical compressor, or any combinations thereof. The system may include a compressor to increase pressure of the hydrogen product to at least 300 bar or at least 350 bar. The compressor may be the electrochemical compressor, a mechanical compressor, an ionic compressor, or a metal hydride compressor, or any combinations thereof. The system may include a purification system to receive retentate (that is at least 90 mol % carbon dioxide) from the region in the membrane reformer external to the tubular membrane. The purification system (if employed) includes a cryogenic distillation column to process the retentate and discharge a liquid bottoms stream as carbon-dioxide product that is at least 99.9 mol % carbon dioxide.

Yet another embodiment is a system for hydrogen production, including a pre-reformer to receive hydrocarbon and convert the hydrocarbon to methane via a pre-reforming catalyst. The system includes a membrane reformer to receive the methane from the pre-reformer, the membrane reformer including a vessel, a reforming catalyst in the vessel to convert the methane into hydrogen and carbon dioxide, and a tubular membrane in the vessel to diffuse the hydrogen through the tubular membrane to a bore of the tubular membrane. The tubular membrane is hydrogen selective and the bore is a permeate side of the tubular membrane. The membrane reformer vessel may include a region that is a reaction space in the vessel external to the tubular membrane for the steam reforming, wherein the region is a retentate side of the tubular membrane, and wherein the reforming catalyst is disposed external to the tubular membrane. An electrical heater may provide heat to the membrane reformer for the steam reforming. The vessel may be a cylindrical vessel. In some implementations, the tubular membrane shares a longitudinal axis with the vessel. In particular implementations, the pre-reformer may be the pre-reforming catalyst in an inlet portion of the vessel, and wherein the pre-reformer and membrane reformer are integrated.

In certain implementations, permeate as discharged from the bore includes steam (sweep gas) and at least 90 mol % hydrogen on a dry basis. A hydrogen purification system processed permeate from the bore of the tubular membrane to give hydrogen product that is at least 99.9 mol % hydrogen. The hydrogen purification system includes a condenser heat exchanger to condense and remove water from the permeate, a vessel having adsorbent to remove components from the permeate to give the hydrogen product comprising at least 99.9 mol % hydrogen, or an electrochemical compressor to increase pressure of the permeate and remove components from the permeate to give the hydrogen product comprising at least 99.9 mol % hydrogen, or any combinations thereof. Is some of the cases in which an electrochemical compressor is employed, the hydrogen purification system does not include the vessel having adsorbent. A compressor may be employed to increase pressure of the hydrogen product to at least 350 bar, wherein the compressor is the electrochemical compressor, a mechanical compressor, a multi-stage compressor, an ionic compressor, or a metal hydride compressor, or any combinations thereof. Lastly, the system for producing hydrogen may include a carbon-dioxide purification system to receive retentate from the region in the vessel external to the tubular membrane, wherein the retentate is at least 90 mol % carbon dioxide. If employed, the carbon-dioxide purification system includes a cryogenic distillation column to process the retentate and discharge a liquid bottoms stream as carbon-dioxide product that is at least 99.9 mol % carbon dioxide.

A number of implementations have been described. Nevertheless, it will be understood that various modifications may be made without departing from the spirit and scope of the disclosure.

What is claimed is:

1. A method of producing hydrogen, comprising:
   feeding hydrocarbon and steam to a pre-reformer comprising a pre-reforming catalyst at a first longitudinal end of a vessel comprising a cylindrical vessel;
   converting hydrocarbon to methane via the pre-reforming catalyst at the pre-reformer to give a pre-reformed intermediate that is a methane-rich mixture;
   flowing the pre-reformed intermediate toward a second longitudinal end of the vessel to a membrane reformer comprising the vessel, a reforming catalyst disposed in the vessel, and a tubular membrane disposed in the vessel, wherein the pre-reformer and the membrane reformer are an integrated unit;
   converting methane in the pre-reformed intermediate to hydrogen and carbon dioxide by steam reforming via the reforming catalyst in the membrane reformer in a region in the vessel external to the tubular membrane, wherein the region is a retentate side of the tubular membrane;
   providing heat to the membrane reformer directly from an electrical heater, wherein the membrane reformer comprises the electrical heater;
   diffusing the hydrogen from the region through the tubular membrane into a bore of the tubular membrane, wherein the tubular membrane is hydrogen selective, and wherein the bore is cylindrical and is a permeate side of the tubular membrane;
   discharging from the vessel a hydrogen stream from the bore at the second longitudinal end; and
   discharging from the vessel a carbon dioxide stream from the region at the second longitudinal end.

2. The method of claim 1, wherein the pre-reformed intermediate and the hydrogen flow in a co-current direction in the vessel, wherein the electrical heater comprises an internal electrical heater disposed in the membrane reformer, and wherein producing hydrogen comprises producing hydrogen in a range of 20 normal cubic meter per hour ($Nm^3/hr$) to 10,000 $Nm^3/hr$.

3. The method of claim 1, comprising converting hydrocarbon, in addition to the methane, in the pre-reformed intermediate in the membrane reformer to hydrogen and carbon dioxide, wherein the steam reforming occurs at less than 600° C. in the vessel, wherein the region comprises a reaction space for the steam reforming, and wherein diffusing the hydrogen through the tubular membrane is contemporaneous with converting the methane to the hydrogen.

4. The method of claim 1, comprising:
   providing a sweep gas to the bore, wherein discharging the hydrogen stream comprises displacing the hydrogen from the bore with the sweep gas, and wherein the hydrogen stream comprises the sweep gas; and
   increasing driving force for hydrogen permeation through the tubular membrane to the bore from the region via displacing the hydrogen from the bore with the sweep gas.

5. The method of claim 4, comprising condensing steam in the hydrogen stream and removing the steam as condensed from the hydrogen stream, wherein the sweep gas comprises steam, and wherein the hydrogen stream as discharged from the bore comprises at least 90 mole percent (mol %) hydrogen on a dry-basis.

6. The method of claim 4, comprising:
purifying the hydrogen stream to give hydrogen product comprising at least 99.9 mol % hydrogen; and
compressing the hydrogen product to a pressure of at least 350 bar.

7. The method of claim 6, wherein the purifying comprises routing the hydrogen stream through a vessel having adsorbent and removing components from the hydrogen stream via the absorbent.

8. The method of claim 6, wherein the purifying and the compressing are performed via an electrochemical compressor.

9. The method of claim 1, comprising:
condensing water in the carbon dioxide stream downstream of the membrane reformer, wherein the carbon dioxide stream as discharged from the vessel from the region comprises at least 90 mole percent (mol %) carbon dioxide;
removing the water as condensed from the carbon dioxide stream; and
cryogenically purifying the carbon dioxide stream to give liquid carbon-dioxide product comprising at least 99 mol % carbon dioxide.

10. The method of claim 1, wherein a first end of the bore is capped, wherein a second end of the bore opposite the first end is at an exit portion of the vessel at the second longitudinal end, and wherein an inner tube is disposed in the bore, wherein an operating temperature of the membrane reformer is less than 650° C., and wherein the hydrocarbon fed to the pre-reformer comprises naphtha, kerosene, gasoline, diesel, liquefied petroleum gas (LPG), natural gas or, mixture of hydrocarbons (C1 to C5), or any combinations thereof.

11. The method of claim 10, comprising:
removing sulfur compounds from the hydrocarbon prior to feeding the hydrocarbon to the pre-reformer, wherein the hydrocarbon as fed to the pre-reformer comprises less than 0.1 parts per million (ppm) of sulfur compounds comprising sulfur (S);
providing a sweep gas at the second end into an annulus between the inner tube and wall of the tubular membrane forming the bore;
flowing the sweep gas through the annulus in a direction countercurrent to flow of the pre-reformed intermediate methane-rich stream in the region;
flowing the sweep gas from the annulus into the inner tube at the first end; and
discharging the sweep gas with the hydrogen from the inner tube at the second end to external of the membrane reformer.

12. The method of claim 1, comprising resisting coking formation in the region at an exit portion at the second longitudinal of the vessel via a dry reforming catalyst disposed in the region in the exit portion, wherein the region at the exit portion comprises a carbon-dioxide rich environment.

13. The method of claim 12, comprising converting the methane to hydrogen via the dry reforming catalyst disposed in the exit portion, wherein the dry reforming catalyst comprises nickel-molybdenum on a magnesium oxide (MgO) support.

14. A system for hydrogen production, comprising:
a pre-reformer in a vessel comprising a cylindrical vessel to receive hydrocarbon at a first longitudinal end of the vessel and convert the hydrocarbon to methane via a pre-reforming catalyst in an inlet portion of the vessel at the first longitudinal end; and
a membrane reformer to receive the methane from the pre-reformer in a direction toward a second longitudinal end of the vessel, the membrane reformer comprising:
a reforming catalyst in the vessel to convert the methane by steam reforming into hydrogen and carbon dioxide; and
a tubular membrane in the vessel to diffuse the hydrogen through the tubular membrane to a bore of the tubular membrane and discharge permeate from the bore and the vessel at the second longitudinal end, the permeate comprising the hydrogen, wherein the tubular membrane is hydrogen selective and the bore is a permeate side of the tubular membrane, and wherein the reforming catalyst is disposed external to the tubular membrane;
the vessel comprising a region in the vessel, the region external to the tubular membrane for the steam reforming, wherein the region is a retentate side of the tubular membrane and to discharge retentate comprising a carbon-dioxide rich stream from the vessel at the second longitudinal end, and wherein the pre-reformer and membrane reformer are an integrated unit; and
an electrical heater to provide heat for the steam reforming.

15. The system of claim 14, wherein the membrane reformer to receive the methane in a methane-rich mixture from the pre-reformer, and wherein the tubular membrane comprises palladium.

16. The system of claim 14, comprising a conduit to provide steam to the pre-reformer, wherein the electrical heater is an internal electric heater disposed in the membrane reformer.

17. The system of claim 16, wherein the tubular membrane shares a longitudinal axis with the vessel.

18. The system of claim 16, wherein the tubular membrane is disposed concentrically in the vessel.

19. The system of claim 14, wherein the membrane reformer comprises a dry reforming catalyst in an outlet portion of the vessel to resist carbon formation in a carbon-dioxide rich environment of the outlet portion in operation.

20. The system of claim 19, wherein the dry reforming catalyst comprises nickel-molybdenum on a magnesium oxide (MgO) support.

21. The system of claim 14, wherein the hydrocarbon comprises naphtha, kerosene, gasoline, diesel, liquefied petroleum gas (LPG), or any combinations thereof, and wherein the reforming catalyst is not in contact with the tubular membrane.

22. The system of claim 14, comprising:
an inner tube concentrically in the bore to facilitate flow of a sweep gas in the bore to displace hydrogen from the bore, wherein a first end of the bore is capped and a second end of the bore opposite the first end is at that second longitudinal end; and
a conduit to provide nitrogen or steam as the sweep gas to the second end to an annulus in the bore between the inner tube and wall of the tubular membrane forming the bore for the sweep gas to flow through the annulus toward the first longitudinal end countercurrent to flow of the methane and enter the inner tube at the first end and discharge from the second end with the hydrogen, wherein the system comprises a hydrogen production capacity in a range of 20 normal cubic meter per hour (Nm³/hr) to 10,000 Nm³/hr.

23. The system of claim 14, wherein the integrated unit is configured to flow the methane and the hydrogen in a co-current direction in the vessel toward the second longitudinal end.

24. The system of claim 14, comprising a hydrogen purification system to process the permeate from the bore to give hydrogen product comprising at least 99.9 mol % hydrogen, the hydrogen purification system comprising a condenser heat exchanger, a vessel having adsorbent, or an electrochemical compressor, or any combinations thereof.

25. The system of claim 24, comprising a compressor to increase pressure of the hydrogen product to at least 350 bar, wherein the compressor comprises the electrochemical compressor, a mechanical compressor, an ionic compressor, or a metal hydride compressor, or any combinations thereof.

26. The system of claim 24, comprising a purification system to receive the retentate from the region, wherein the retentate comprises at least 90 mol % carbon dioxide, the purification system comprising a cryogenic distillation column to process the retentate and discharge a liquid bottoms stream as carbon-dioxide product comprising at least 99.9 mol % carbon dioxide, and wherein the hydrogen purification system does not comprise the vessel having adsorbent.

27. A system for hydrogen production, comprising:
a pre-reformer in a vessel comprising a cylindrical vessel to receive hydrocarbon at a first longitudinal end of the vessel and convert the hydrocarbon to methane via a pre-reforming catalyst in an inlet portion of the vessel;
a membrane reformer to receive the methane from the pre-reformer from the inlet portion toward a second longitudinal end of the vessel opposite the first longitudinal end, wherein the pre-reformer and the membrane reformer are an integrated unit, the membrane reformer comprising the vessel, a reforming catalyst in the vessel to convert the methane into hydrogen and carbon dioxide, and a tubular membrane in the vessel to diffuse the hydrogen through the tubular membrane to a bore of the tubular membrane and discharge the hydrogen as permeate from the bore at the second longitudinal end, wherein the reforming catalyst is disposed external to the tubular membrane, wherein the tubular membrane is hydrogen selective and the bore is a permeate side of the tubular membrane, wherein a retentate side of the tubular membrane comprises a region that is a reaction space in the vessel external to the tubular membrane for the steam reforming and to discharge retentate comprising at least 90 mole percent (mol %) carbon dioxide from the vessel at the second longitudinal end;
an electrical heater disposed at the membrane reformer to provide heat directly to the membrane reformer for the steam reforming; and
a hydrogen purification system to process permeate from the bore to give hydrogen product comprising at least 99.9 mol % hydrogen, the hydrogen purification system comprising a condenser heat exchanger, a vessel having adsorbent, or an electrochemical compressor, or any combinations thereof.

28. The system of claim 27, wherein the membrane reformer comprises:
a region that is a reaction space in the vessel external to the tubular membrane for the steam reforming, wherein the region is a retentate side of the tubular membrane, and wherein the reforming catalyst is disposed external to the tubular membrane; and
a dry reforming catalyst in the region at an outlet portion of the vessel at the second longitudinal end to resist carbon formation in a carbon-dioxide rich environment of the region at the outlet portion in operation.

29. The system of claim 28, comprising a carbon-dioxide purification system to receive the retentate from the region, the carbon-dioxide purification system comprising a cryogenic distillation column to process the retentate and discharge a liquid bottoms stream as carbon-dioxide product comprising at least 99.9 mol % carbon dioxide.

30. The system of claim 27, comprising a conduit to provide steam to the pre-reformer, wherein the integrated unit is configured to flow the methane and the hydrogen in a co-current direction in the vessel toward the second longitudinal end, wherein the electrical heater is an internal electric heater disposed in the membrane reformer, and wherein the tubular membrane shares a longitudinal axis with the vessel.

31. The system of claim 28, wherein the dry reforming catalyst comprises nickel-molybdenum on a magnesium oxide (MgO) support.

32. The system of claim 27, comprising a compressor to increase pressure of the hydrogen product to at least 350 bar, wherein the compressor comprises the electrochemical compressor, a mechanical compressor, a multi-stage compressor, an ionic compressor, or a metal hydride compressor, or any combinations thereof.

33. The system of claim 27, comprising:
an inner tube concentrically in the bore to facilitate flow of a sweep gas in the bore to displace the hydrogen as the permeate from the bore, wherein a first end of the bore is capped and a second end of the bore opposite the first end is at that second longitudinal end; and
a conduit to provide the sweep gas to the second end to an annulus in the bore between the inner tube and wall of the tubular membrane forming the bore for the sweep gas to flow through the annulus toward the first end countercurrent to flow of the methane and enter the inner tube at the first end and discharge from the second end with the hydrogen, wherein the permeate as discharged from the bore comprises steam and at least 90 mole percent (mol %) hydrogen on a dry basis.

34. The system of claim 27, wherein the hydrogen purification system comprises the condenser heat exchanger to condense and remove water from the permeate.

35. The system of claim 27, wherein the hydrogen purification system comprises the vessel having adsorbent to remove components from the permeate to give the hydrogen product comprising at least 99.9 mol % hydrogen.

36. The system of claim 27, wherein the hydrogen purification system comprises the electrochemical compressor to increase pressure of the permeate and remove components from the permeate to give the hydrogen product comprising at least 99.9 mol % hydrogen.

37. The system of claim 36, wherein the hydrogen purification system does not comprise the vessel having adsorbent.

\* \* \* \* \*